(12) United States Patent
Fukushima et al.

(10) Patent No.: US 9,189,454 B2
(45) Date of Patent: Nov. 17, 2015

(54) TWO-WHEELED MOTOR VEHICLE AND CONTROL DEVICE THEREFOR

(75) Inventors: Kenji Fukushima, Shizuoka (JP); Hiroyuki Inoue, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 250 days.

(21) Appl. No.: 13/988,117

(22) PCT Filed: Nov. 18, 2011

(86) PCT No.: PCT/JP2011/076688
§ 371 (c)(1),
(2), (4) Date: Jun. 6, 2013

(87) PCT Pub. No.: WO2012/067234
PCT Pub. Date: May 24, 2012

(65) Prior Publication Data
US 2013/0245900 A1   Sep. 19, 2013

(30) Foreign Application Priority Data

Nov. 19, 2010 (JP) .................................. 2010-258959
May 30, 2011 (WO) .................. PCT/JP2011/062420

(51) Int. Cl.
*F16H 61/02* (2006.01)
*G06F 17/00* (2006.01)
(Continued)

(52) U.S. Cl.
CPC .............. *G06F 17/00* (2013.01); *B60T 8/1706* (2013.01); *B60W 40/112* (2013.01); *B62J 27/00* (2013.01);
(Continued)

(58) Field of Classification Search
CPC ... F16H 61/0213; F16H 61/061; F16H 59/44; B60W 10/06; B60W 10/11
USPC ........ 701/41, 51, 61; 180/181, 197, 218, 219, 180/220
See application file for complete search history.

(56) References Cited

U.S. PATENT DOCUMENTS 5,217,087 A   6/1993 Ikegami et al.
5,411,325 A * 5/1995 Tanaka et al. ................. 303/150
(Continued)

FOREIGN PATENT DOCUMENTS

EP   0 473 978 A1   3/1992
EP   0 475 093 A1   3/1992
(Continued)

OTHER PUBLICATIONS

JP 2007239809 A_machine translation; publication Sep. 20, 2007.*
(Continued)

*Primary Examiner* — Helal A Algahaim
*Assistant Examiner* — Jelani Smith
(74) *Attorney, Agent, or Firm* — Keating & Bennett, LLP

(57) ABSTRACT

A two-wheeled motor vehicle includes a control device and is configured such that a radius of curvature of a cross-section of a tire mounted on one of the front wheel and the rear wheel is larger than a radius of curvature of a cross-section of a tire mounted on the other wheel. The control device includes a sensor arranged to detect a rotation speed of the one wheel, a sensor arranged to detect a rotation speed of the other wheel, and a turn determining section programmed to determine that the vehicle is turning based on a condition that a value corresponding to a bank angle of the vehicle is higher than a threshold. The value corresponding to the bank angle of the vehicle is a value indicating the relative amount of the rotation speed of the one wheel relative to the rotation speed of the other wheel.

16 Claims, 20 Drawing Sheets

(51) Int. Cl.
*B60W 40/112* (2012.01)
*B62J 27/00* (2006.01)
*F16H 61/16* (2006.01)
*B60T 8/17* (2006.01)
*F16H 59/50* (2006.01)

(52) U.S. Cl.
CPC ............ *F16H 61/16* (2013.01); *B60T 2210/22* (2013.01); *B60T 2260/04* (2013.01); *B60W 2520/28* (2013.01); *B60Y 2200/12* (2013.01); *B62K 2207/02* (2013.01); *F16H 59/50* (2013.01); *F16H 2061/163* (2013.01)

(56) References Cited

U.S. PATENT DOCUMENTS

| | | | |
|---|---|---|---|
| 5,444,625 A * | 8/1995 | Tanaka et al. | 701/90 |
| 5,691,900 A * | 11/1997 | Luckevich | 701/41 |
| 6,268,794 B1 * | 7/2001 | Tzanev | 340/475 |
| 6,313,742 B1 | 11/2001 | Larson | |
| 2003/0132837 A1 * | 7/2003 | Hasegawa et al. | 340/440 |
| 2007/0066443 A1 * | 3/2007 | Matsudaira et al. | 477/115 |
| 2007/0186705 A1 * | 8/2007 | Suzuki | 74/335 |
| 2009/0012676 A1 * | 1/2009 | Kawamura et al. | 701/38 |
| 2009/0132133 A1 * | 5/2009 | Kojima et al. | 701/52 |
| 2010/0017077 A1 * | 1/2010 | Oshima et al. | 701/51 |
| 2011/0073401 A1 * | 3/2011 | Hanawa et al. | 180/220 |
| 2011/0095599 A1 * | 4/2011 | Watanabe | 303/137 |

FOREIGN PATENT DOCUMENTS

| | | |
|---|---|---|
| EP | 0 575 991 A2 | 12/1993 |
| EP | 2 063 153 A2 | 5/2009 |
| JP | 5-637 A | 1/1993 |
| JP | 2007-239809 A | 9/2007 |
| JP | 2007239809 A * | 9/2007 |
| JP | 2007-278850 A | 10/2007 |
| JP | 2009-127689 A | 6/2009 |
| JP | 2010-012903 A | 1/2010 |

OTHER PUBLICATIONS

Official Communication issued in International Patent Application No. PCT/JP2011/076688, mailed on Feb. 21, 2012.
Official Communication issued in corresponding European Patent Application No. 11841352.5, mailed on Dec. 4, 2014.
Official Communication issued in corresponding International Application PCT/JP2011/062420, mailed on Aug. 9, 2011.
English translation of Official Communication issued in corresponding International Application PCT/JP2011/076688, mailed on Jun. 20, 2013.

* cited by examiner

TWO-WHEELED MOTOR VEHICLE AND CONTROL DEVICE THEREFOR

BACKGROUND OF THE INVENTION

1. Field of the Invention

The present invention relates to a two-wheeled motor vehicle, and in particular to a technique to detect turning of the vehicle.

2. Description of the Related Art

Japanese Patent Laid-open Publication No. 2009-127689 discloses a device for detecting turning of a two-wheeled motor vehicle. When a vehicle turns with the steering handle rotated rightward or leftward, the front wheel runs on a course outside the course of the rear wheel. This is disclosed in Japanese Patent Laid-open Publication No. 2009-127689, and it is determined that a vehicle is turning when the rotation speed of the front wheel is faster than that of the rear wheel.

However, a two-wheeled motor vehicle running at a high speed turns by inclining the vehicle body, that is, by banking, without rotating the steering handle. In such a case, the difference in the course between the front wheel and the rear wheel is small, and therefore, the device disclosed in Japanese Patent Laid-open Publication No. 2009-127689 cannot appropriately detect turning of the vehicle.

SUMMARY OF THE INVENTION

In order to overcome the problems described above, preferred embodiments of the present invention provide a two-wheeled motor vehicle and a control device therefor that accurately detects turning of a vehicle running at a high speed.

In a two-wheeled motor vehicle including a control device according to a preferred embodiment of the present invention, a radius of curvature of a cross-section of a tire mounted on one of the front wheel and the rear wheel is larger than a radius of curvature of a cross-section of a tire mounted on the other wheel. The control device includes a sensor arranged to detect a rotation speed of the one wheel, a sensor arranged to detect a rotation speed of the other wheel, and a turn determining section programmed to determine that the vehicle is turning based on a condition that a value corresponding to a bank angle of the vehicle is higher than a threshold. The value corresponding to the bank angle of the vehicle is a value indicating the relative amount of the rotation speed of the one wheel relative to the rotation speed of the other wheel. According to preferred embodiments of the present invention, it is possible to appropriately detect turning of a vehicle at high speed running.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
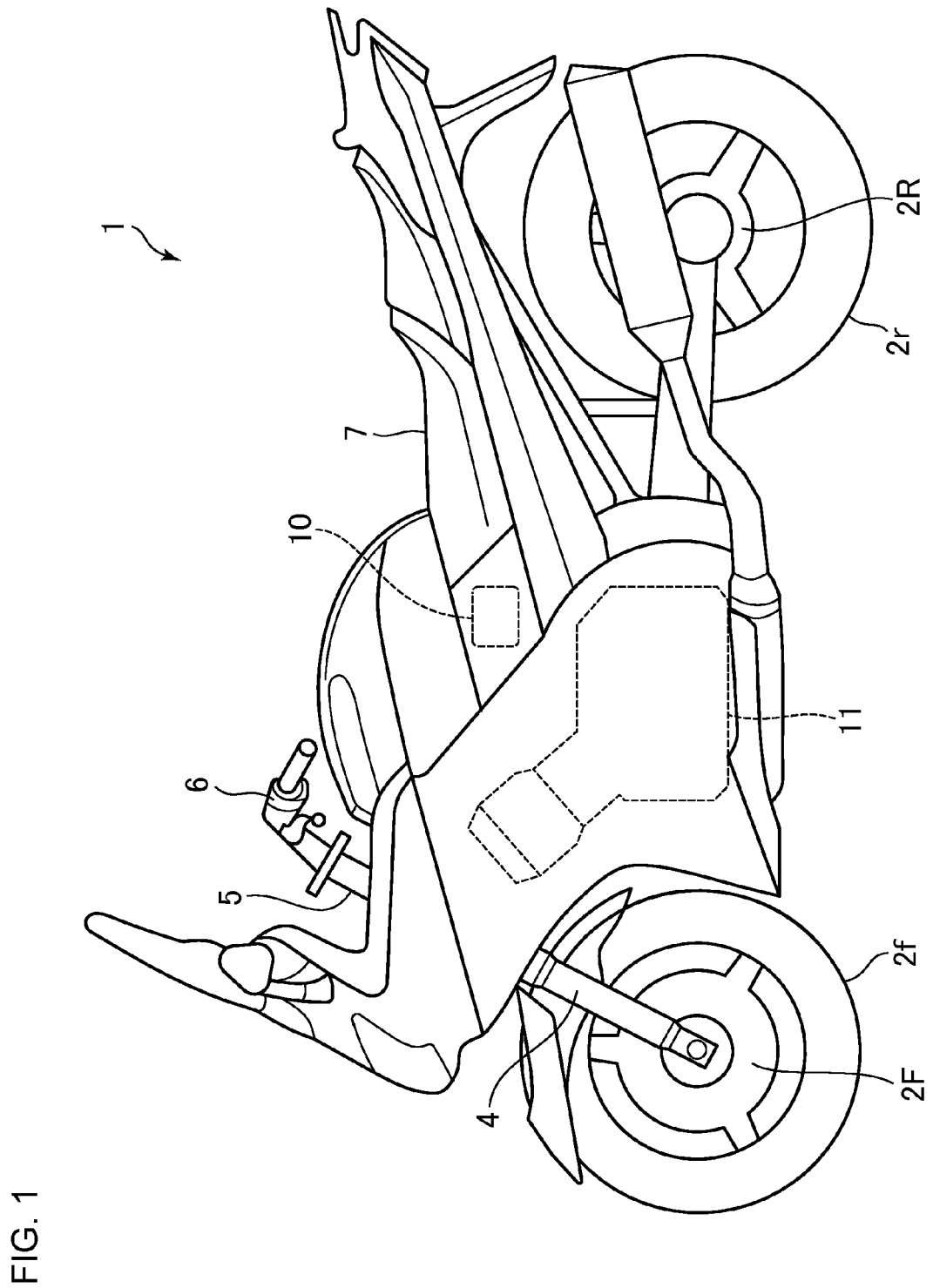
FIG. 1 is a side view of a two-wheeled motor vehicle including a control device according to a preferred embodiment of the present invention.

In the following, preferred embodiments of the present invention will be described with reference to the drawings. FIG. 1 is a side view of a two-wheeled motor vehicle 1 including a control device 10 according to a preferred embodiment of the present invention.

The two-wheeled motor vehicle 1 includes a front wheel 2F, a rear wheel 2R, and an engine unit 11. The front wheel 2F is supported at the lower end of a front fork 4. The upper portion of the front fork 4 is connected to a steering shaft 5. The steering shaft 5 is connected to a steering handle 6 to be steered by a driver. The steering shaft 5 is rotatably supported by a vehicle body frame (not shown), and the steering handle 6, the front fork 4, and the front wheel 2F rotate leftward or rightward around the steering shaft 5 when steered by the driver. The steering handle 6 includes a brake lever and an accelerator grip to be operated by the driver. The front wheel 2F and the rear wheel 2R are braked by operating the brake lever. A seat 7 is mounted at the rear of the steering handle 6 for the driver to sit thereon while straddling the vehicle 1. The rear wheel 2R is mounted at the rear of the engine unit 11 and driven by a drive force output from the engine unit 11.

Figure 2:
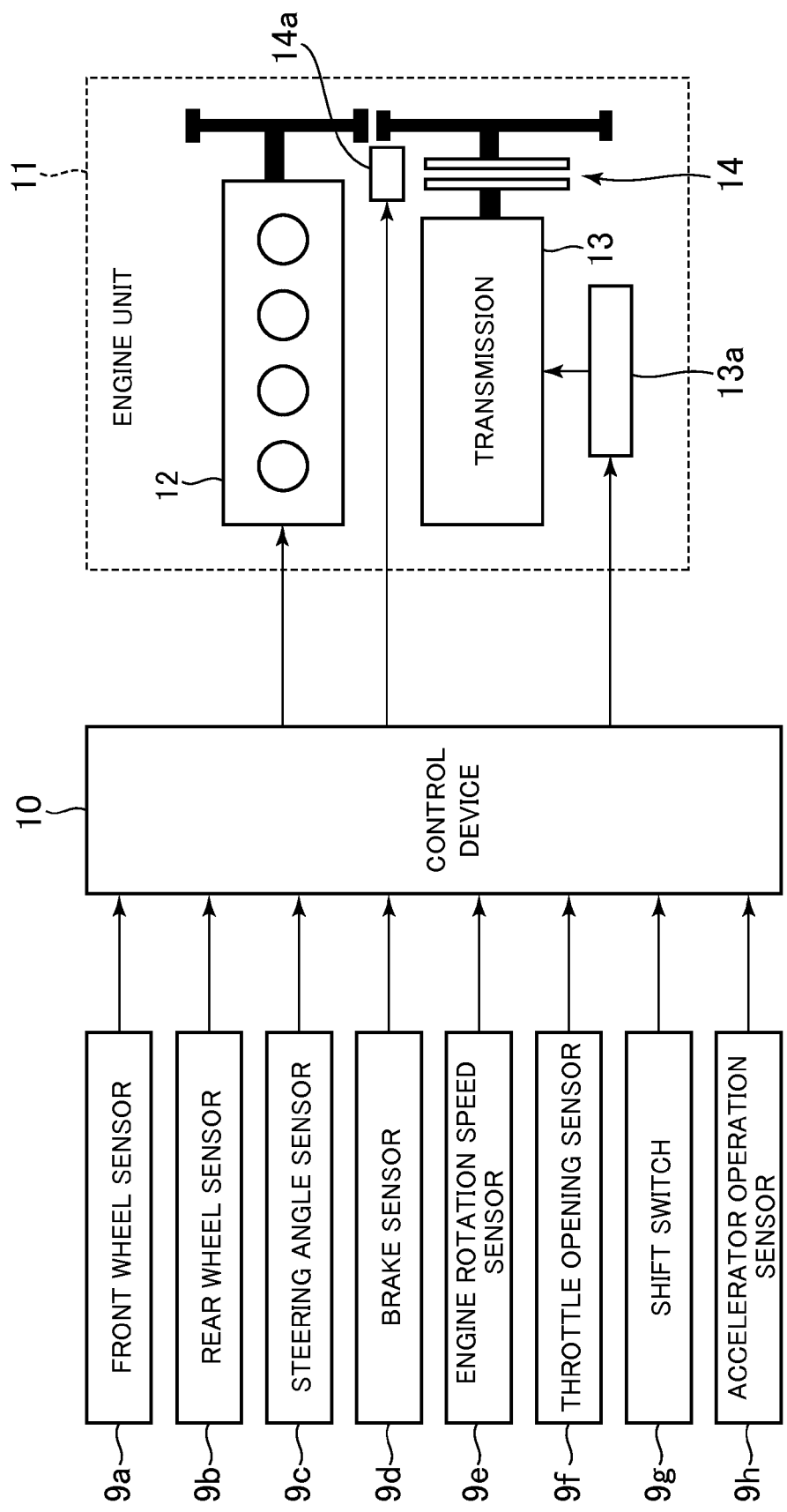
FIG. 2 schematically shows a structure of the above mentioned two-wheeled motor vehicle.

FIG. 2 schematically shows a structure of the two-wheeled motor vehicle 1.

The engine unit 11 includes an engine 12 and a transmission 13. Further, the engine unit 11 includes a clutch 14 mounted between the engine 12 and the transmission 13. Still further, the engine 12 includes a throttle valve to control the amount of air to be supplied to the engine 12, a fuel injection device to inject fuel to be supplied to the engine 12, and an ignition plug to ignite the fuel. These components are controlled by the control device 10.

Further, the engine unit 11 includes a shift actuator 13a to actuate the transmission 13 and a clutch actuator 14a to actuate the clutch 14. The clutch actuator 14a causes engagement and disengagement of the clutch 14. The transmission 13 preferably is a gear-type transmission, for example, and includes a plurality of gear pairs corresponding to shift levels, respectively. Each gear is actuated by the shift actuator 13a. That is, the shift actuator 13a causes engagement and disengagement of the gears constituting a pair to achieve a target shift level. The shift actuator 13a and the clutch actuator 14a are controlled by the control device 10. The transmission 13 is not limited to the above mentioned transmission, and may be a belt-type transmission, for example. The two-wheeled motor vehicle 1 includes a front wheel sensor 9a, a rear wheel sensor 9b, a steering angle sensor 9c, and a brake sensor 9d. An output signal from each sensor is input to the control device 10.

The front wheel sensor 9a is a rotation sensor to detect the rotation speed (that is, a rotation angle (a rotation number) per a unit period) of the front wheel 2F. A rear wheel sensor 9b is a sensor to detect the rotation speed (a rotation angle (a rotation number) per a unit period) of the rear wheel 2R. The front wheel sensor 9a and the rear wheel sensor 9b are mounted on the front wheel 2F and the rear wheel 2R, respectively, and each outputs a pulse signal having a frequency corresponding to the rotation speed. The control device 10 is programmed to calculate the rotation speed of the front wheel 2F and that of the rear wheel 2R based on the output signals from the front wheel sensor 9a and the rear wheel sensor 9b, respectively. Alternatively, the rear wheel sensor 9b may be mounted on the output shaft of the transmission 13 or the rear wheel sensor 9b may be mounted on the input shaft of the transmission 13. In this case, the control device 10 is programmed to calculate the rotation speed of the rear wheel 2R based on the transmission ratio of the transmission 13 and an output signal from the rear wheel sensor 9b.

The steering angle sensor 9c is mounted on the steering shaft 5 and outputs a signal corresponding to the steering angle (the rotation angle of the steering shaft 5). The control device 10 is programmed to calculate the steering angle based on an output signal from the steering angle sensor 9c.

The brake sensor 9d detects a brake operation by the driver and is, mounted, for example, on a brake lever of the steering handle 6, and outputs an ON/OFF signal according to the presence or absence of a brake operation. The control device 10 is programmed to determine the presence or absence of a brake operation based on an output signal from the brake sensor 9d.

In the example shown in FIG. 2, the two-wheeled motor vehicle 1 includes an engine rotation speed sensor 9e to detect the engine rotation speed, a throttle opening sensor 9f to detect the opening degree of a throttle valve (in the following, referred as "a throttle opening degree"), a shift switch 9g to be operated by the driver to output a shift instruction (a shift-up or shift-down instruction) to the control device 10, and an accelerator operation sensor 9h to detect the amount of operation of an accelerator grip on the steering handle 6. Output signals from these sensors as well are input to the control device 10. A ship-up switch and a shift-down switch may be provided as the above shift switch 9g.

The control device 10 includes a CPU (Central Processing Unit) and a memory, such as a ROM (Read Only Memory) and a RAM (Random Access Memory). The control device 10 causes the CPU to execute a program stored in the memory to control the engine 12, the transmission 13, and the clutch 14, for example. That is, the control device 10 adjusts the opening degree of the throttle valve, the amount of fuel to be injected by the fuel injection device, and ignition timing of the ignition plug to control the engine torque. Further, the control device 10 is programmed to activate the clutch actuator 14a and the shift actuator 13a to switch the transmission ratios.

The control device 10 is programmed to determine whether or not a vehicle is turning based on the rotation speed of the front wheel 2F and that of the rear wheel 2R. Generally, a two-wheeled motor vehicle running at a high speed turns by banking. That is, the vehicle body of the two-wheeled motor vehicle is inclined to turn. The control device 10 is programmed to calculate a value corresponding to the bank angle of the vehicle body based on the rotation speed of the front wheel 2F and that of the rear wheel 2R, and to determine that the vehicle is turning based on a condition that the value is higher than a threshold. The control device 10 restricts shifting of the transmission when the vehicle is turning.

Figure 3:
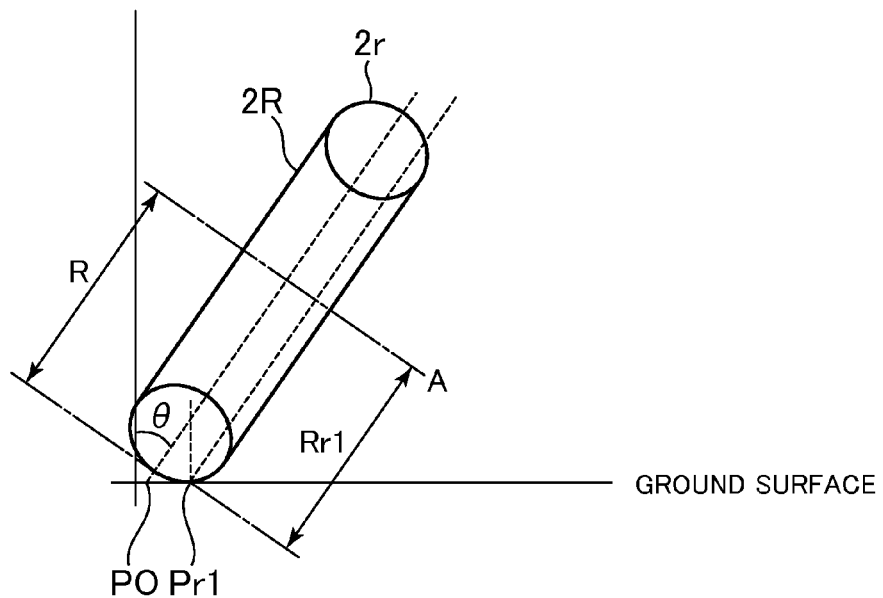
FIG. 3 outlines turn determination according to a preferred embodiment of the present invention, schematically showing the rear wheel of a vehicle banking.
Figure 4:
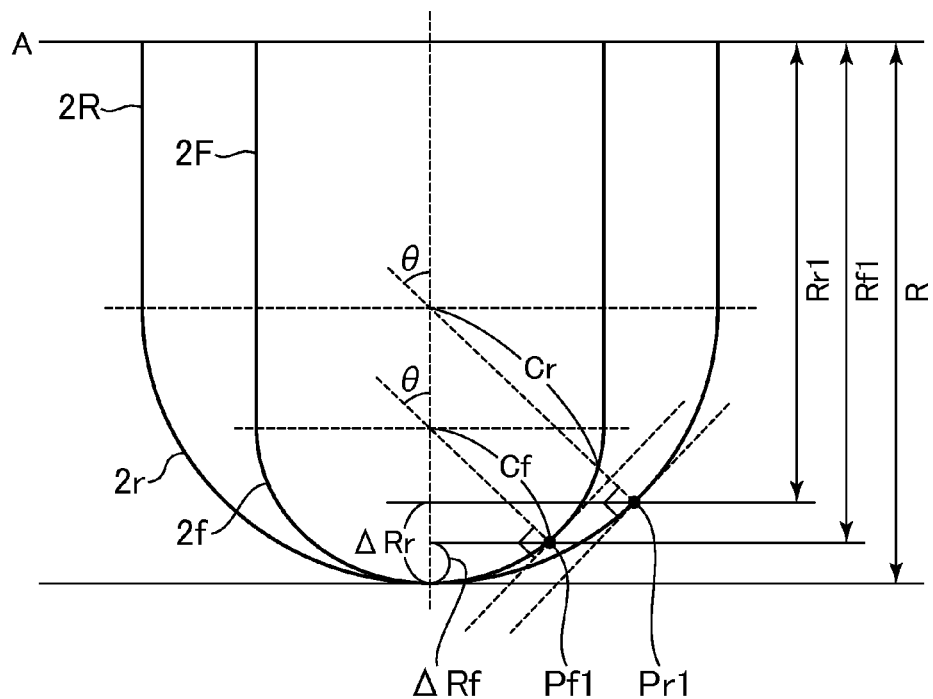
FIG. 4 outlines turn determination according to a preferred embodiment of the present invention, schematically showing the front tire and the rear tire.

Below, turn detection will be described. FIG. 3 schematically shows the rear wheel 2R when a vehicle is banking. FIG. 4 schematically shows a front tire 2f mounted on the outside circumference of the front wheel 2F and a rear tire 2r mounted on the outside circumference of the rear wheel 2R. For brevity of description, it is assumed here that the diameter of the front wheel 2f is equal to that of the rear wheel 2r in the description below.

When running straight, a vehicle is standing upright with the top portion (the middle PO in the width direction of each tire 2f, 2r) in a cross-section (a cross-section including the axle A) of each tire 2f, 2r in contact with the ground surface. In this case, the distance from the axle A to a contact point (a portion in contact with the ground surface) of each tire 2f, 2r corresponds to the radius R of the tire 2f, 2r. Meanwhile, when a vehicle is banking, a position Pf1, Pr1 displaced from the middle PO in the width direction of each tire 2f, 2r is in contact with the ground surface (see FIG. 3). Therefore, the distance Rf1, Rr1 from the axle A to the contact point on each tire 2f, 2r is smaller than the distance R with a vehicle standing upright.

According to a study by the inventor of the present application, it has been discovered that the reduction (R−Rr1, R−Rf1) of the distance Rf1, Rr1 from the axle A to a contact point depends on the curvature radius Cf, Cr (a crown radius of the tire 2f, 2r) of a cross-section of the tire 2f, 2r. In the two-wheeled motor vehicle 1 according to the present preferred embodiment, the curvature radius Cr of the tire 2r of the rear wheel 2R, that is a drive wheel, is larger than the curvature radius Cf of the tire 2f of the front wheel 2F, that is a follower wheel. According to a study by the inventor, as shown in FIG. 4, the reduction ΔRr (ΔRr=R−Rr1) of the distance Rr1 from the contact point Pr1 of the rear tire 2r to the axle A is larger than the reduction ΔRf (ΔRf=R−Rf1) of the distance Rf1 from the contact point of the front tire 2f to the axle A. That is, with the bank angle θ of a vehicle, the equation below holds:

$$\Delta Rf = Cf(1-\cos\theta)$$

$$\Delta Rr = Cr(1-\cos\theta).$$

Because the curvature radius Cr of the rear tire 2r is larger than the curvature radius Cf of the front tire 2f, ΔRr becomes larger than ΔRf. Further, a larger bank angle θ leads to a larger reduction ΔRf, ΔRr. Still further, a larger bank angle θ leads to a larger difference (ΔRr−ΔRf) in the reduction.

When a vehicle is running straight, the rotation speed of the front wheel 2F is equal to that of the rear wheel 2R. That is, supposing that the radius of the front tire 2f is equal to that of the rear tire 2r, the equation below describes a vehicle running straight:

$$\omega r - \omega f = 0$$

wherein ωf is the rotation speed of the front wheel 2F, which is detectable by the front wheel sensor 9a, and ωr is the rotation speed of the rear wheel 2R, which is detectable by the rear wheel sensor 9b.

When a vehicle is banking, on the other hand, even though the actual vehicle speed is equal to that of the vehicle running straight, the rotation speed of the front wheel 2F and that of the rear wheel 2R increase because the distance from the axle A to the contact point on the tire 2f, 2r becomes shorter, as described above. That is, when a vehicle banks at the same speed (R×ωr, R×ωf) as the speed in running straight, the equation below holds:

$$\omega r1 = R \times \omega r/(R - Cr(1-\cos\theta))$$

$$\omega f1 = R \times \omega f/(R - Cf(1-\cos\theta))$$

wherein ωf1 is the rotation speed of the front wheel 2F with the vehicle banking, and ωr1 is the rotation speed of the rear wheel 2R with the vehicle banking. As expressed by these equations, the rotation speed ωr1 of the rear wheel 2R and the rotation speed ωf1 of the front wheel 2F of a vehicle banking are higher than the rotation speeds ωr, ωf, respectively, of the vehicle running straight. The rotation speed ωr1, ωf1 becomes higher as the bank angle θ becomes larger.

As described above, the reduction ΔRr for the rear wheel 2R is larger than the reduction ΔRf for the front wheel 2F. Therefore, an increased rate of the rotation speed of the rear wheel 2R due to displacement of a contact point with a vehicle banking is larger than that of the front wheel 2F. Further, a larger bank angle leads to a larger difference (ΔRr−ΔRf) in the reductions, as described above. That is, a larger bank angle leads to a larger difference (ωr−ωf) in the rotation speed between the rear wheel 2R and the front wheel 2F. Therefore, supposing that the radius of the tire 2f is equal to that of the tire 2r, the equations below describes a vehicle banking.

$$\omega r - \omega f = \Delta\omega > 0$$

wherein Δω becomes larger depending on the bank angle.

Figure 5:
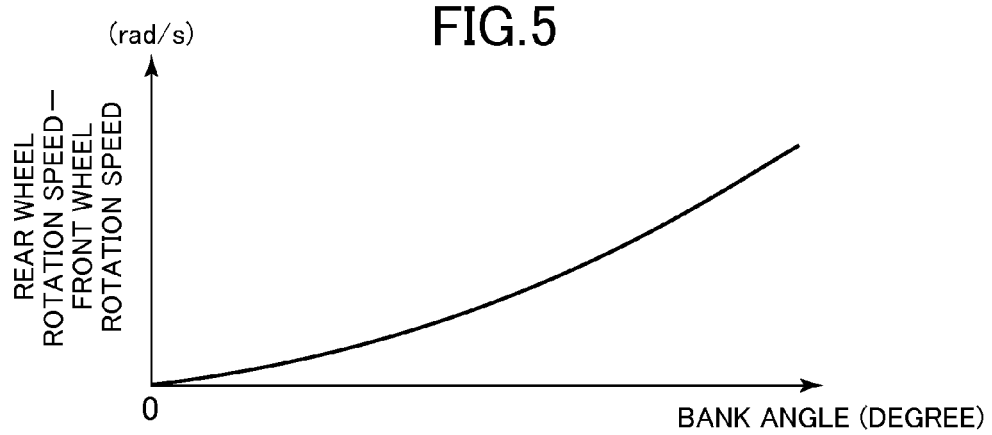
FIG. 5 is a graph showing a relationship between the difference in the rotation speed between the rear wheel and the front wheel and a bank angle.

FIG. 5 is a graph showing a relationship between the difference (ωr−ωf) in the rotation speed between the rear wheel 2R and the front wheel 2F and the bank angle. As shown in the diagram, when the bank angle becomes larger, the difference in the rotation speed between the rear wheel 2R and the front wheel 2F, that is, a value (ωr−ωf) indicating the relative amount of the rotation speed of the rear wheel 2R relative to that of the front wheel 2F also becomes larger. Therefore, the control device 10 is programmed to determine that a vehicle is turning based on a condition that the value indicating the relative amount of the rotation speed of the rear wheel 2R relative to the rotation speed of the front wheel 2F is higher than a threshold (in the following, a turn determination threshold).

Similarly, the above holds with wheel speed, which is a product of the radius of the tire 2r, 2f multiplied by the rotation speed ωr, ωf, when the radius of the rear tire 2r differs from that of the front tire 2f. Specifically, supposing that the radius of the tire 2r of the rear wheel 2R is defined as Rr and that of the tire 2f of the front wheel 2F is as Rf, the below describes a vehicle running straight:

$$\omega r \times Rr - \omega f \times Rf = 0$$

wherein ωr×Rr is the rear wheel speed, and ωf×Rf is the front wheel speed.

When the vehicle is banking, the equation below holds.

$$\omega r \times Rr - \omega f \times Rf > 0$$

The difference becomes larger as the bank angle becomes larger. That is, in both of the cases in which the radii Rf, Rr of the tires 2f, 2r are equal to and differ from each other, it is possible to detect banking of a vehicle.

Figure 6:
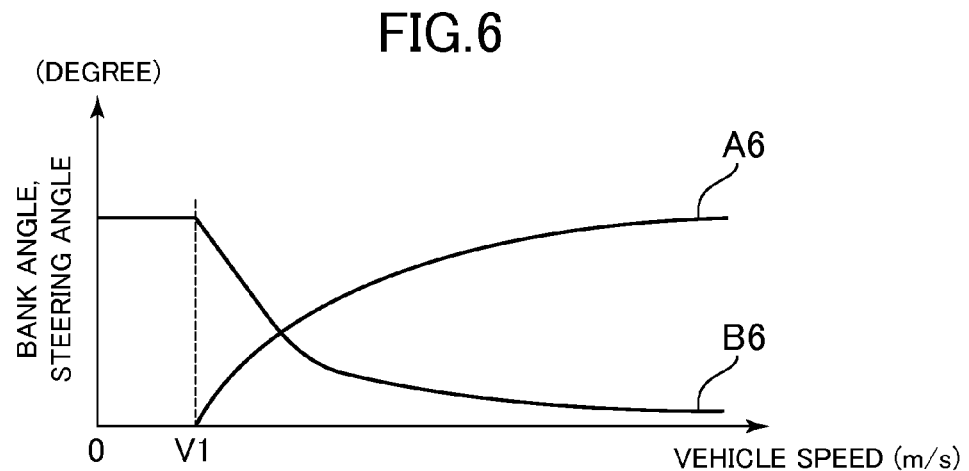
FIG. 6 describes banking and rotating a steering handle, in which the line A6 shows a change in the bank angle relative to the vehicle speed, and the line 6B shows a change in the steering angle relative to the vehicle speed.

A two-wheeled motor vehicle running at a slow speed turns mainly by rotating the steering handle 6. FIG. 6 describes banking and rotating a steering handle. The line A6 in FIG. 6 indicates a change in the bank angle relative to the vehicle speed, and the line 6B indicates a change in the steering angle relative to the vehicle speed. As shown in the diagram, a two-wheeled motor vehicle running at a slow speed (at a vehicle speed V1 or lower in FIG. 6) turns by rotating the steering handle 6 without banking. Meanwhile, when the vehicle speed exceeds V1, the steering angle of the steering handle 6 becomes gradually smaller, and the bank angle becomes gradually larger. At a high speed, a two-wheeled motor vehicle turns mainly by banking.

When the steering handle 6 is rotated, the rear wheel 2R runs on the inner side than the course of the front wheel 2F. Therefore, in this case, the rotation speed of the rear wheel 2R becomes lower than that of the front wheel 2F.

Figure 7:
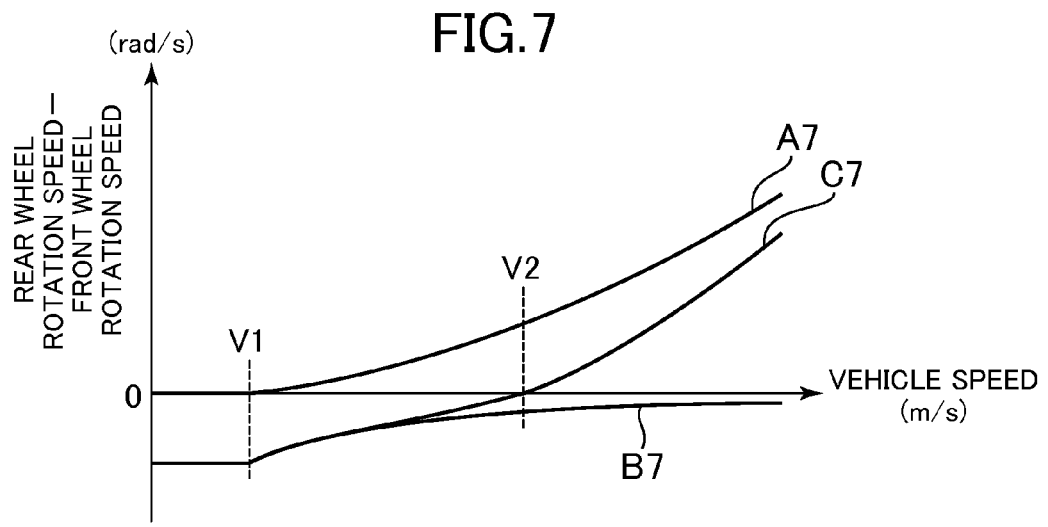
FIG. 7 is a graph showing a relationship between the difference in the rotation speed between the rear wheel and the front wheel and the vehicle speed.

FIG. 7 is a graph showing a relationship between the difference (ωr−ωf) between the rotation speed ωr of the rear wheel 2R and the rotation speed ωf of the front wheel 2F and the vehicle speed. In the diagram, the line A7 indicates a relationship between the vehicle speed and the difference in the rotation speeds attributed to banking, the line B7 indicates a relationship between the vehicle speed and the difference in the rotation speed attributed to rotation of the steering handle 6, and the line C7 indicates the sum of the value indicated by the line A7 and that by the line B7.

As described above, a two-wheeled motor vehicle running at a slow speed (at the vehicle speed V1 or lower) turns mainly by rotating the steering handle 6. Therefore, at a slow speed, the rotation speed of the front wheel 2F tends to become higher than that of the rear wheel 2R. As a result, when the radius of the tire 2f is equal to that of the tire 2r, the difference (ωr−ωf) in the rotation speeds attributed to the steering angle of the steering handle 6 takes a negative value, as indicated by the line B7. Meanwhile, the difference in the rotation speeds attributed to banking is 0 at a slow speed (see the line A7). When the vehicle speed is in excess of V1, the steering angle of the steering handle 6 becomes gradually smaller as shown in FIG. 6, and accordingly, the difference in the rotation speeds attributed to the steering angle of the steering handle 6 becomes gradually closer to 0, as indicated by the line B7.

Meanwhile, at a vehicle speed in excess of V1, the bank angle becomes gradually larger, and accordingly, the difference in the rotation speeds attributed to banking becomes gradually larger as indicated by the line A7.

The rotation speeds calculated based on an output signal from the front wheel sensor 9a and that from the rear wheel sensor 9b are a value reflecting both the influence of rotation of the steering handle 6 and the influence of banking. Thus, the difference in the rotation speeds calculated by the control device 10 is a value indicated by the line 7C, that is the sum of the line A7 and the line B7. Therefore, the above mentioned turn determination threshold used by the control device 10 is 0, for example, such that turning of the vehicle is detected in a driving region with the vehicle speed higher than V2. That is, turning can be appropriately detected at high speed running of the vehicle.

Figure 8:
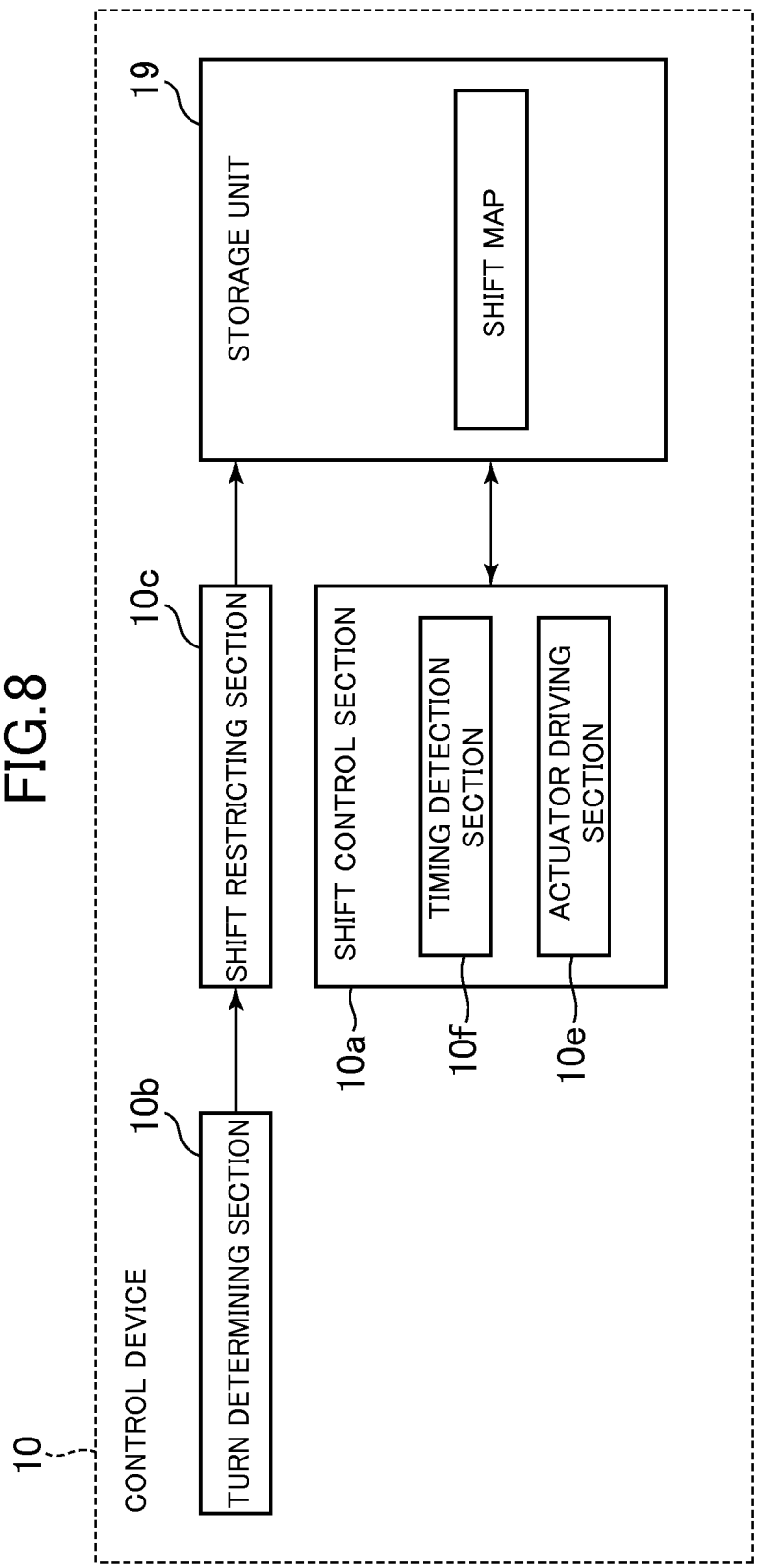
FIG. 8 is a block diagram showing functions of the control device.

In the following, a process executed by the control device 10 will be specifically described. FIG. 8 is a block diagram showing functions of the control device 10. As shown in the diagram, the control device 10 includes a shift control section 10a, a turn determining section 10b, and a shift restricting section 10c. These sections are provided by the CPU by executing programs stored in the memory of the control device 10. Further, the control device 10 includes a storage unit 19. The storage unit 19 includes the memory of the control device 10.

The shift control section 10a executes a control to change the transmission ratio of the transmission 13 (in the following, shift control). In this example, the shift control section 10a includes an actuator driving section 10e and a timing detection section 10f. The actuator driving section 10e actuates the clutch actuator 14a and the shift actuator 13a, following a predetermined procedure, to shift up or down the shift level. Specifically, after the clutch actuator 14a releases engagement of the clutch 14, the actuator driving section 10e switches the gear pair to transmit a drive force in accordance with a shift instruction, and then engages the clutch 14 (this control is referred as the shift control).

The timing detection section 10f detects a timing to start the shift control. The actuator driving section 10e starts the shift control when the shift timing has arrived. A process by the timing detection section 10f is executed as follows, for example.

Figure 9:
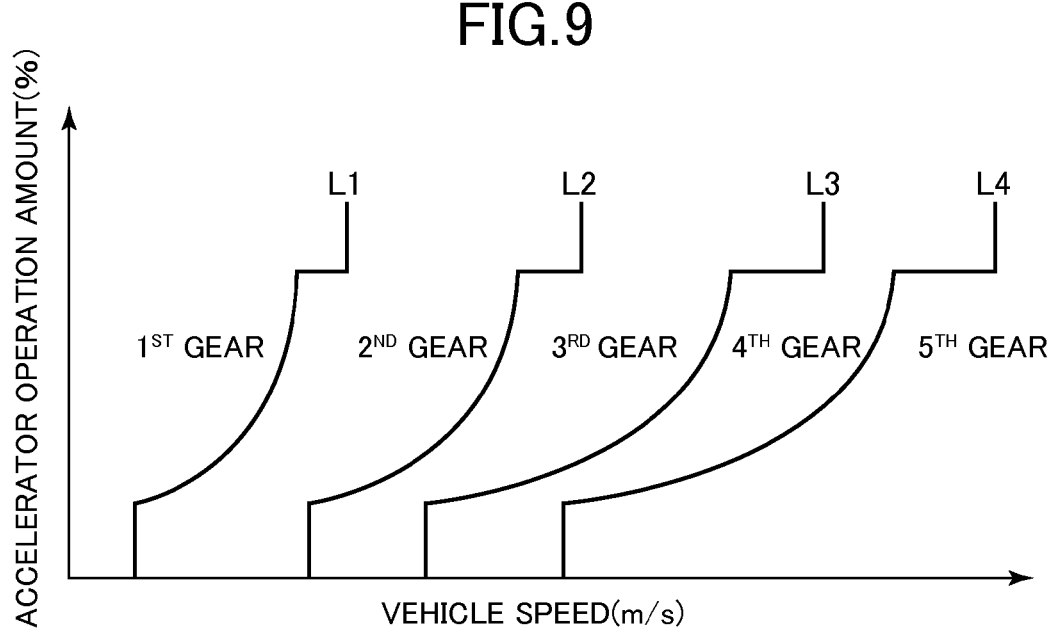
FIG. 9 shows an example of a shift map used in a process by the control device.

The timing detection section 10f detects arrival of the shift timing based on a map (in the following, a shift map) stored in the storage unit 19 (an automatic shift mode). FIG. 9 shows an example of a shift map. The shift map correlates each driving state (a driving state defined by the vehicle speed and the amount of operation of the accelerator, in the example in FIG. 9) to either shift level. The timing detection section 10f monitors the current driving state while a vehicle is running, and determines that the shift timing arrives when a shift level correlated to the current driving state is changed. Referring to FIG. 9, shift lines L1 to L4 to change the shift level are defined in the shift map. The timing detection section 10f determines that the shift timing arrives when the current driving state exceeds each of the shift lines L1 to L4.

Further, the timing detection section 10f may detect the shift timing based on a shift instruction (specifically, operation of the shift switch 9g) made by the driver (a manual shift mode). That is, the timing detection section 10f may determine that the shift timing arrives when the shift switch 9g is turned on.

Note that only one of the manual shift mode and the automatic shift mode may be provided. The automatic shift mode and the manual shift mode may be selectable by an operation of a switch by the driver.

The turn determining section 10b determines whether or not a vehicle is turning based on the rotation speed of the front wheel 2F and that of the rear wheel 2R. In the present preferred embodiment, when a value corresponding to the bank angle of a vehicle, obtained based on the rotation speed of the front wheel 2F and that of the rear wheel 2R, is higher than the above-described turn determination threshold, it is determined that the vehicle is turning. Specifically, when a value indicting the relative amount of the rotation speed of the rear wheel 2R relative to the rotation speed of the front wheel 2F (hereinafter referred to as a relative speed value) is higher than the turn determination threshold, it is determined that the vehicle is turning. Alternatively, the turn determining section 10b may determine that a vehicle is turning when not only the above mentioned condition concerning the relative speed value but also when any other condition (for example, a condition concerning a vehicle speed or a steering angle) is satisfied.

When the vehicle is determined to be turning, the shift restricting section 10c executes a process to restrict the shift control by the shift control section 10a (in the following, a shift restriction process).

Figure 10:
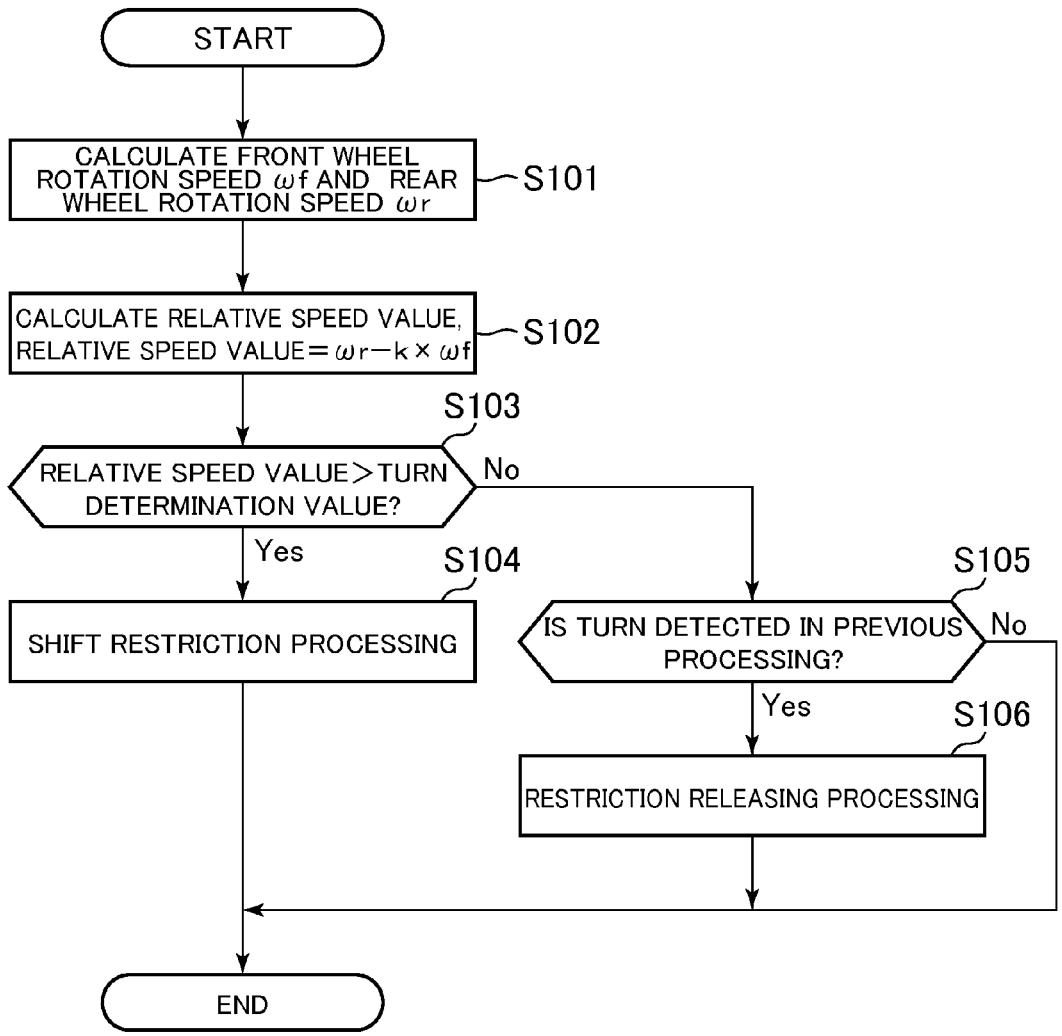
FIG. 10 is a flowchart showing an example of a process executed by the control device.

FIG. 10 is a flowchart of an example of a process executed by the turn determining section 10b and the shift restricting section 10c. The process shown in FIG. 10 is repetitively executed while the vehicle is running.

Initially, the control device 10 is programmed to calculate the rotation speed of the front wheel 2F and that of the rear wheel 2R based on output signals from the front wheel sensor 9a and the rear wheel sensor 9b, respectively (S101).

Then, the turn determining section 10b is programmed to calculate a value indicative of the relative amount of the rotation speed of the rear wheel 2R relative to that of the front wheel 2F (that is, the above mentioned relative speed value) (S102). In this example, the turn determining section 10b calculates the relative speed value in consideration of the difference in the radius between the front tire 2f and the rear tire 2r. Specifically, the turn determining section 10b multiplies a coefficient k corresponding to the difference in the radius between the tires 2f and 2r to one or both of the rotation speed of the rear wheel 2R and that of the front wheel 2F, and then subtracts the rotation speed of the front wheel 2F from that of the rear wheel 2R. The turn determining section 10b outputs the result ($\omega r - k \times \omega f$ in the example shown in FIG. 10, wherein $\omega r$=the rotation speed of the rear wheel 2R, $\omega f$=the rotation speed of the front wheel 2F) as the relative speed value.

The coefficient k compensates for the difference in the radius between the front tire 2f and the rear tire 2r. With multiplication of the coefficient K to one or both of the rotation speed of the rear wheel 2R and that of the front wheel 2F, the difference (for example, above mentioned $\omega r - k \times \omega f$) in the rotation speed becomes 0 when the two-wheeled motor vehicle 1 is running straight. Supposing that the radius of the tire 2f is defined as Rf and that of the tire 2r is as Rr, the equation $$k = Rf/Rr$$

holds.

A relative speed value calculated with this coefficient k indicates the relative amount of the rear wheel speed ($Vr = \omega r \times Rr$) relative to the front wheel speed ($Vf = \omega f \times Rf$). In other words, the relative speed value is a result ($Vr - Vf$) obtained by subtracting the front wheel speed from the rear wheel speed or a result ($Vr/Vf$) obtained by dividing the rear wheel speed by the front wheel speed.

Alternatively, the radius Rf, Rr itself may be used as the coefficient k. That is, the relative speed value may be calculated using the expression below.

Relative speed value=$\omega r \times Rr - \omega f \times Rf$

The relative speed value is not limited to the value obtained by subtracting the rotation speed of the front wheel 2F from that of the rear wheel 2R. For example, the relative speed value may be the ratio (for example, $\omega r/(k \times \omega f)$) of the rotation speed of the rear wheel 2R relative to that of the front wheel 2F. When a ratio is used as the relative speed value, the relative speed value becomes 1 when the vehicle is running straight.

Having calculated the relative speed value at S102, the turn determining section 10b determines whether or not the relative speed value is higher than the turn determination threshold Th1 (S103). In the example described here, the coefficient k is used. Therefore, it is determined in the process at S103 that whether or not the rotation speed of the rear wheel 2R is higher than that of the front wheel 2F by the turn determination threshold even when the difference in the radius between the tires 2f and 2r is taken into consideration. In other words, the turn determining section 10b determines whether or not a value corresponding to the rear wheel speed is higher than a value corresponding to the front wheel speed by a predetermined value.

When the relative speed value is higher than the turn determination threshold Th1, the turn determining section 10b determines that the vehicle is turning. For example, the turn determination threshold Th1 is set to a value higher than a relative speed value calculated when the vehicle is running straight. That is, when the relative speed value is $\omega r - k \times \omega f$, a value higher than 0 is set as the turn determination threshold. Meanwhile, when the relative speed value is $\omega r/(k \times \omega f)$, a value higher than 1 is set as the turn determination threshold.

Alternatively, the relative speed value may not necessarily be calculated at S102 prior to the determination at S103. For example, the turn determining section 10b may add the turn determination threshold Th1 to the rotation speed of the front wheel 2F (specifically, $\omega f \times k$) at S102, and determine at S103 whether or not the rotation speed of the rear wheel 2R is higher than the result of the addition ($\omega f \times k + Th1$). That is, it is sufficient in a preferred embodiment of the present invention that as long as whether or not the relative speed value is higher than the turn determination threshold Th1 is determined, the relative speed value may not be necessarily calculated in the process by the turn determining section 10b.

When the turn determining section 10b determines that the vehicle is turning, the shift restricting section 10c executes a shift restriction processing (S104), hereinafter "shift restriction process."

For example, a flag indicating whether shift control is allowed or restricted (in the following, a shift restriction flag) is stored in the storage unit 19, and the shift restricting section 10 changes the shift restriction flag into the ON state (a state with shifting restricted) as a shift restriction process.

With the above, the shift control section 10a executes the process described below. The shift control section 10a checks the state of the shift restriction flag when a shift instruction from the driver (that is, when the shift switch 9g is turned on) is made or when a shift level obtained with reference to the shift map is changed. The shift control section 10a does not start the shift control when the shift restriction flag is in the ON state.

As a shift restriction process, the shift restricting section 10c may change the shift map shown in FIG. 9 to restrict the shift control. In other words, the shift restricting section 10c may change the shift map to delay arrival of the shift timing.

Figure 11:
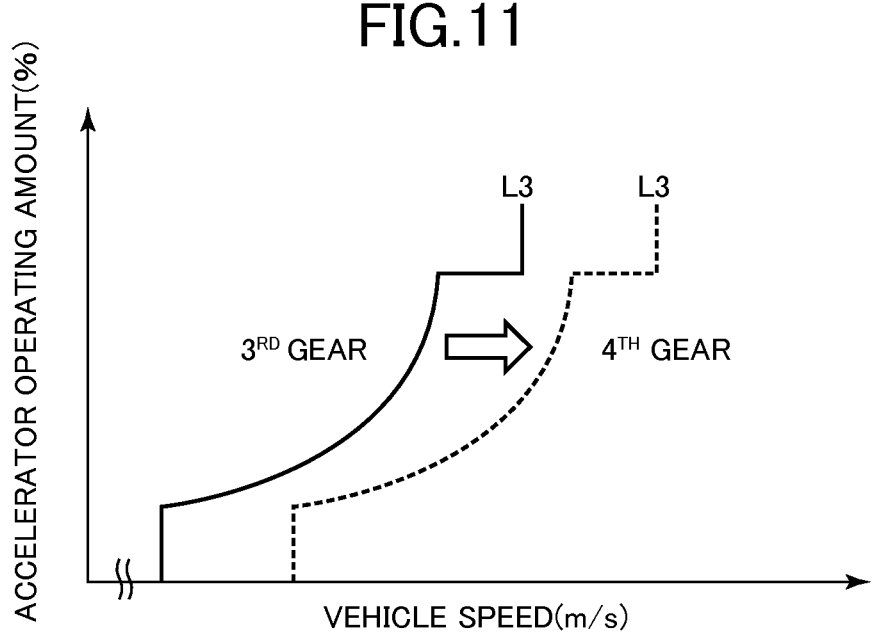
FIG. 11 describes a shift restriction process executed by the control device.

For example, as shown in FIG. 11, the shift restricting section 10c shifts a shift line so as to restrict the shift control. That is, as to the shift map for shift-up, a shift line is shifted toward a higher speed so that shifting up is executed at a speed higher than usual. Meanwhile, as to the shift map for shift-down, a shift line is shifted toward a lower speed so that shifting down is executed at a speed lower than usual.

When the above mentioned two kinds of shift modes, namely, the automatic shift mode and the manual shift mode, are available, the shift restriction process may be executed only when either one of the two modes is selected. For example, the shift restriction process may be executed only when the automatic shift mode is selected. With the above, shift control according to a shift instruction by the driver is allowed even while the vehicle is turning.

Upon determination at S103 that the vehicle is not turning, that is, when the relative speed value is not higher than the turn determination threshold Th1, the shift restricting section 10c executes the following process, for example. That is, as shown in FIG. 10, the shift restricting section 10c determines whether or not it has been determined in the previous processing operation, hereinafter "previous process" (specifically, in the determination at previous S102) that the vehicle is turning (S105). This determination is enabled by using a flag indicating a determination at S102 that the vehicle is turning. That is, at S104, the on/off state of the flag is checked. The flag may be, for example, the above mentioned shift restriction flag.

When the vehicle has been determined as turning in the previous process, the shift restriction flag has already been set in the ON state and the shift map has already been changed. Therefore, when the vehicle is determined as not turning in the current process at S102 but as turning in the previous process at S102 (yes at S105), the shift restricting section 10c executes a process to release the restriction of shifting (in the following, restriction release processing, hereinafter "restriction release process") (S106). That is, the shift restricting section 10c places the shift restriction flag into the OFF state, for example. Meanwhile, when the shift map has been changed, the shift restricting section 10c returns the shift map to its original state. That is, the shift restricting section 10c returns the shift line shown in FIG. 11 to its original position.

When it is determined in the process at S105 that the vehicle has been determined as not turning in the previous process, the control device 10 ends the current process, and resumes the process at S101.

Alternatively, in the determination at S102, the turn determining section 10b may determine whether or not any other condition (in the following, an additional condition) is satisfied. That is, the turn determining section 10b may determine that the vehicle is turning when the above mentioned condition concerning the relative speed value and the additional condition are both satisfied.

Figure 12:
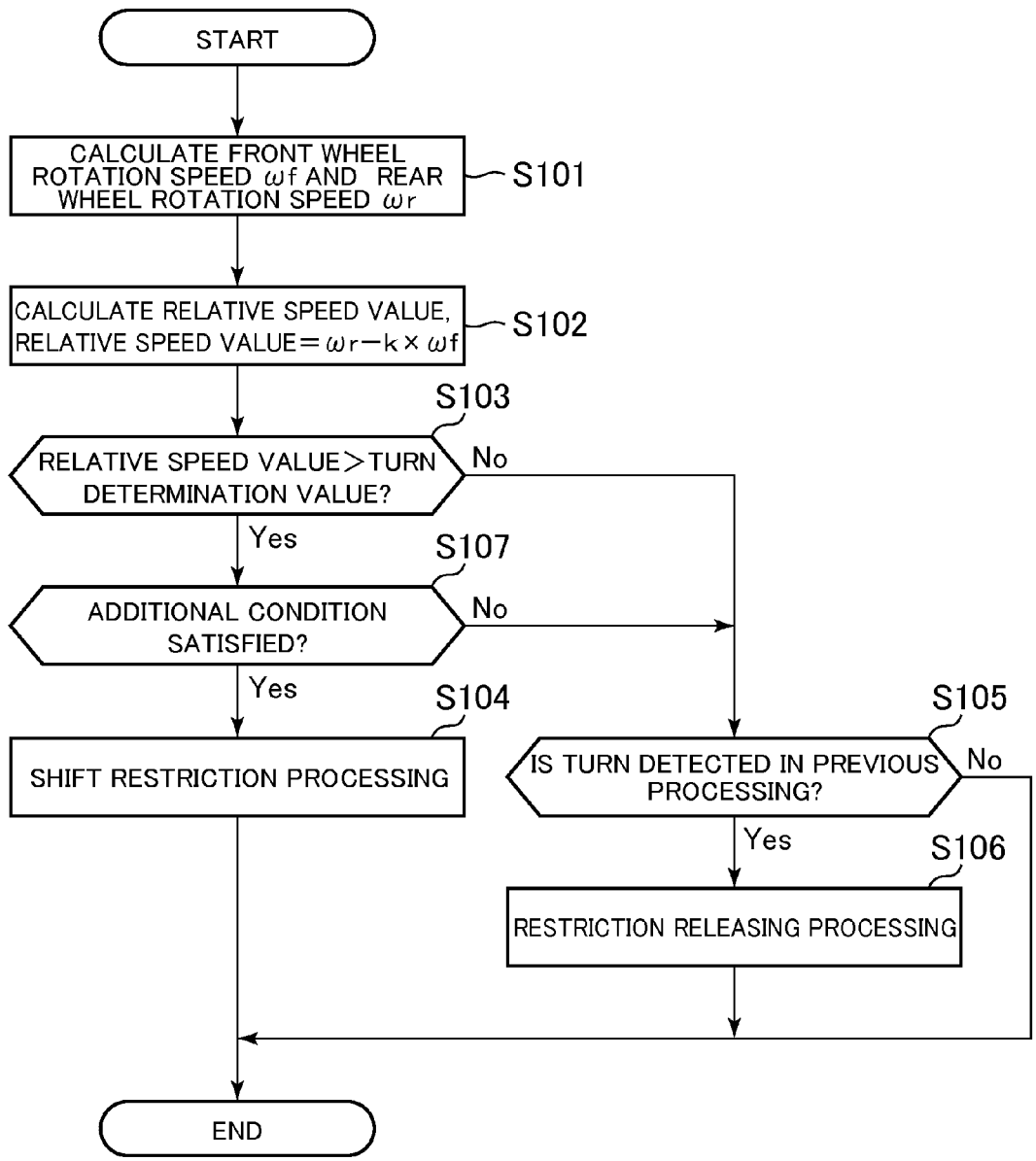
FIG. 12 is a flowchart showing another example of a process executed by the control device.

FIG. 12 is a flowchart showing another example of a process executed by the turn determining section 10b. In the flowchart, the processes that are the same as that in the flowchart shown in FIG. 10 are given the same reference numerals. In the example in the flowchart in FIG. 12, after the determination at S102, the turn determining section 10b determines whether or not the driving state of the vehicle satisfies the additional condition (S107). The additional condition is a condition concerning, for example, the vehicle speed, the engine torque, a brake operation, or the steering angle of the steering handle 6.

For example, the turn determining section 10b determines at S107 whether or not the vehicle speed is higher than a predetermined threshold. When the vehicle speed is higher than the threshold, the turn determining section 10b determines that the vehicle is turning. This enables more accurate detection of turning of a vehicle running at a high speed. An accurate detection of the vehicle speed is difficult to be achieved while a vehicle is turning as a contact point on the tire 2r, 2f is displaced, as described above. The front wheel speed (ωf×Rf), for example, is used as the vehicle speed. Alternatively, the average of the front wheel speed and the rear wheel speed (ωr×Rr) may be used as the vehicle speed.

The turn determining section 10b may determine whether or not the engine torque or an engine power calculated based on the engine torque is lower than a predetermined threshold. When the engine torque or the engine power is lower than the threshold, the turn determining section 10b may determine that the vehicle is turning. When the engine torque is higher, the relative speed value may become higher due to a slight deformation of the tire 2r of the rear wheel 2R. The above described determination utilizing an engine torque can reduce the influence in the turn determination to the relative speed value from deformation of the tire 2r during acceleration. The engine torque can be obtained with reference to a map stored in the storage unit 19. The map correlates, for example, the engine rotation speed, the throttle opening degree, and the engine torque. With reference to the map, the turn determining section 10b calculates an engine torque correlated to the values detected by the engine rotation speed sensor 9e and the throttle opening sensor 9f. Further, an engine power can be calculated as a product of the engine torque multiplied by the engine rotation speed.

The turn determining section 10b may determine at S107 whether or not a brake operation is performed based on an output signal from the brake sensor 9d. When no brake operation is performed, the turn determining section 10b may determine that the vehicle is turning. When the front wheel 2F is subjected to braking, the rotation speed of the rear wheel 2R may become higher than that of the front wheel 2F. Therefore, an additional condition that a brake operation is not performed can enhance accuracy in turn determination. Note that it is sufficient that determination as to whether or not a brake operation is performed is made only with respect to the front wheel 2F.

The turn determining section 10b may determine at S107 whether or not the steering angle of the steering handle 6 detected by the steering angle sensor 9c is higher than a predetermined threshold. When the steering angle is higher than the threshold, the turn determining section 10b may determine that the vehicle is turning.

Two or three additional conditions described above out of the plurality of additional conditions may be combined. For example, it may be determined that the vehicle is turning when the above described additional conditions concerning the vehicle speed and a brake operation are both satisfied.

As described above, the turn determining section 10b determines that a vehicle is turning based on a condition that a value (that is, a relative speed value) corresponding to the bank angle of the vehicle obtained based on the rotation speed of the front wheel 2F and that of the rear wheel 2R is higher than a turn determination threshold. Specifically, the relative speed value is a value indicating the relative amount of the rotation speed of the rear wheel 2R (a wheel having a tire 2r mounted thereon with a relatively larger curvature radius) relative to the rotation speed of the front wheel 2F. Therefore, it is possible to appropriately detect turning at a high speed, in particular.

When it is determined that the vehicle is turning, the shift restricting section 10c executes a process to restrict shift control by the shift control section 10a (that is, the above described shift restriction process). With the above, it is possible to maintain the shift level while the vehicle is turning. In particular, when the shift restriction process is executed only in the automatic shift mode, it is possible to restrict shifting not intended by the driver while the vehicle is turning.

In the example of the process in FIG. 12, the turn determining section 10b determines whether or not the vehicle is turning based further on the vehicle speed, the engine torque, the brake operation, or the steering angle of the steering handle. With the above, accuracy in turning determination is further improved.

Note that the preferred embodiments of the present invention are not limited to the above described control device 10, and various modifications are possible. In the following, examples of these modifications will be described.

In the above described process by the turn determining section 10b, the same condition is used as the turn start determination and the turn end determination. However, the turn determining section 10b may use different conditions as the turn start determination and the turn end determination. A condition used in the turn end determination may be satisfied after a condition for the turn start determination becomes no longer satisfied. That is, hysteresis may be provided to the start determination condition and the end determination condition.

Figure 13:
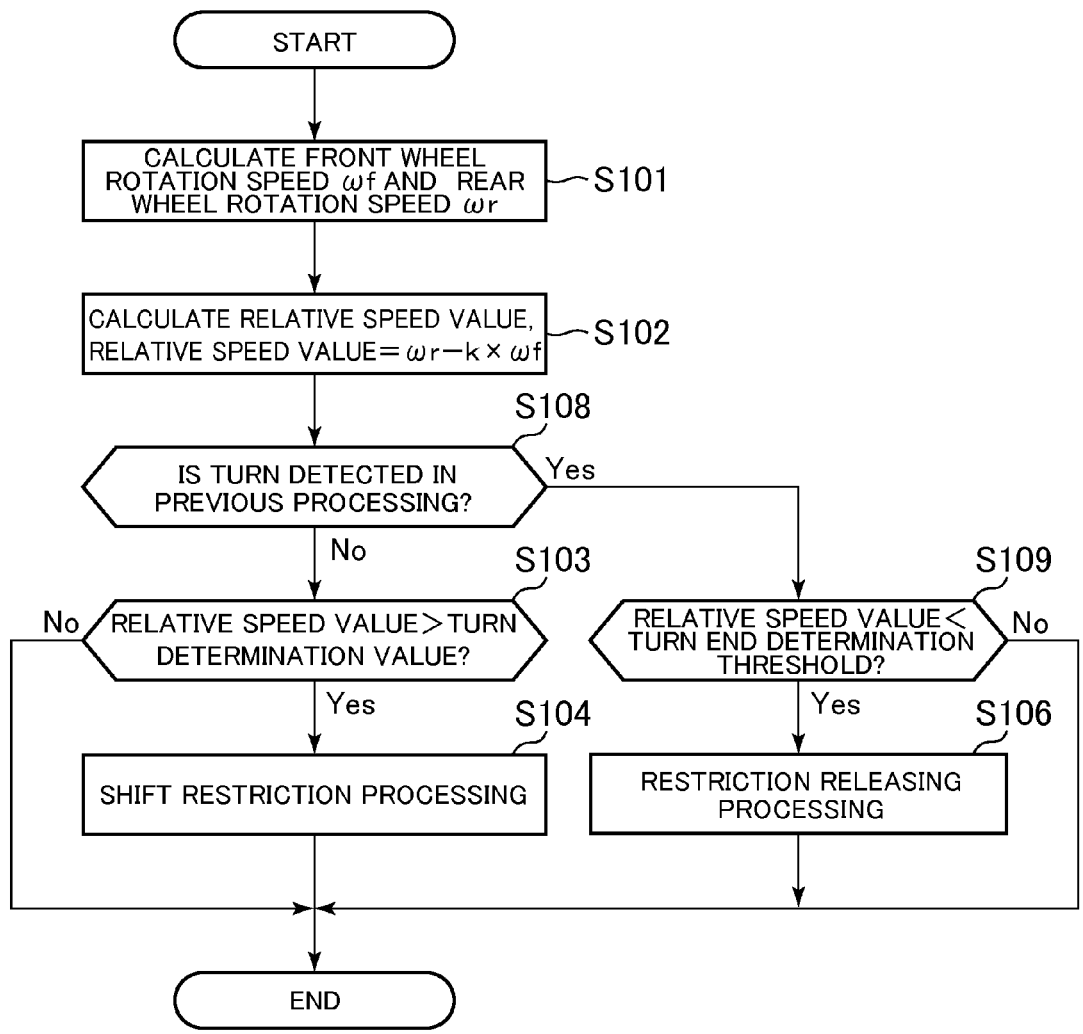
FIG. 13 is a flowchart showing another example of a process executed by the control device.

FIG. 13 is a flowchart of an example of a process executed by the turn determining section 10b in the present preferred embodiment. This process is repetitively executed while the vehicle is running. In the flowchart, the processes that are the same as the above described processes are given the same reference numerals.

Initially, the control device 10 calculates the rotation speed of the front wheel 2F and that of the rear wheel 2R (S101), and the turn determining section 10b calculates the relative speed value based on the rotation speeds (S102). Thereafter, the turn determining section 10b determines whether or not the vehicle is already turning (S108). Specifically, similar to the above described S105, the turn determining section 10b can make the determination, for example, by checking a flag stored in the storage unit 19 that indicates that the vehicle is turning. That is, at S108, the turn determining section 10b checks the ON/OFF state of the flag. When it is determined that the vehicle is not turning, the turn determining section 10b then determines whether or not the vehicle has started turning. That is, the turn determining section 10b determines whether or not the relative speed value is higher than a turn determination threshold (S103, start determination). The processes at S103 and thereafter are similar to those in the flowchart in FIG. 10.

Meanwhile, when it is determined that the vehicle is already turning, the turn determining section 10b determines that the turning of the vehicle has ended (end determination). Specifically, the turn determining section 10b determines whether or not the relative speed value (for example, ωr−k×ωf or ωr/(k×ωf)) is lower than a predetermined threshold (in the following, a turn end determination threshold Th2) (S109). The turn end determination threshold Th2 is a value lower than the above mentioned turn determination threshold Th1. According to this process, the end of turning is determined after the start determination condition (the relative speed value>the turn determination threshold Th1) becomes no longer satisfied.

When the end of turning is detected, the shift restricting section 10c executes the above mentioned restriction release process to release the shift restriction (S106). Meanwhile, when the relative speed value is higher than the turn end determination threshold Th2, it is determined that the turning has not yet ended. In this case, the control device 10 ends the current process, and resumes the processes at S101 and thereafter.

At S109, the turn determining section 10b may determine whether or not a situation where the relative speed value is lower than the turn end determination threshold Th2 has lasted longer than a predetermined period. In a case where the situation has lasted longer than a predetermined period, the turn determining section 10b may determine that turning has ended. According to this process, it is possible to delay the determination that turning has ended. As a result, it is possible to restrict execution of shifting up when a vehicle returns from turning to straight running, so that acceleration can be enhanced. Further, when the above mentioned predetermined period is longer, the determination that a vehicle is turning can be kept even after the vehicle comes out of a curved path. As a result, it is possible to maintain the shift control restriction even when a short straight path intervenes between successive curved paths.

The above-described turn determining section 10b determines whether or not a value indicating the relative amount of the rotation speed of the rear wheel 2R (that is, the relative speed value) is higher than the turn determination threshold. Alternatively, the turn determining section 10b may estimate the bank angle of a vehicle based on the steering angle detected by the steering angle sensor 9c and the rotation speeds of the front wheel 2F and of the rear wheel 2R. Then, the turn determining section 10b may determine that the vehicle is turning based on a condition that the estimated bank angle is larger than the threshold.

Figure 14:
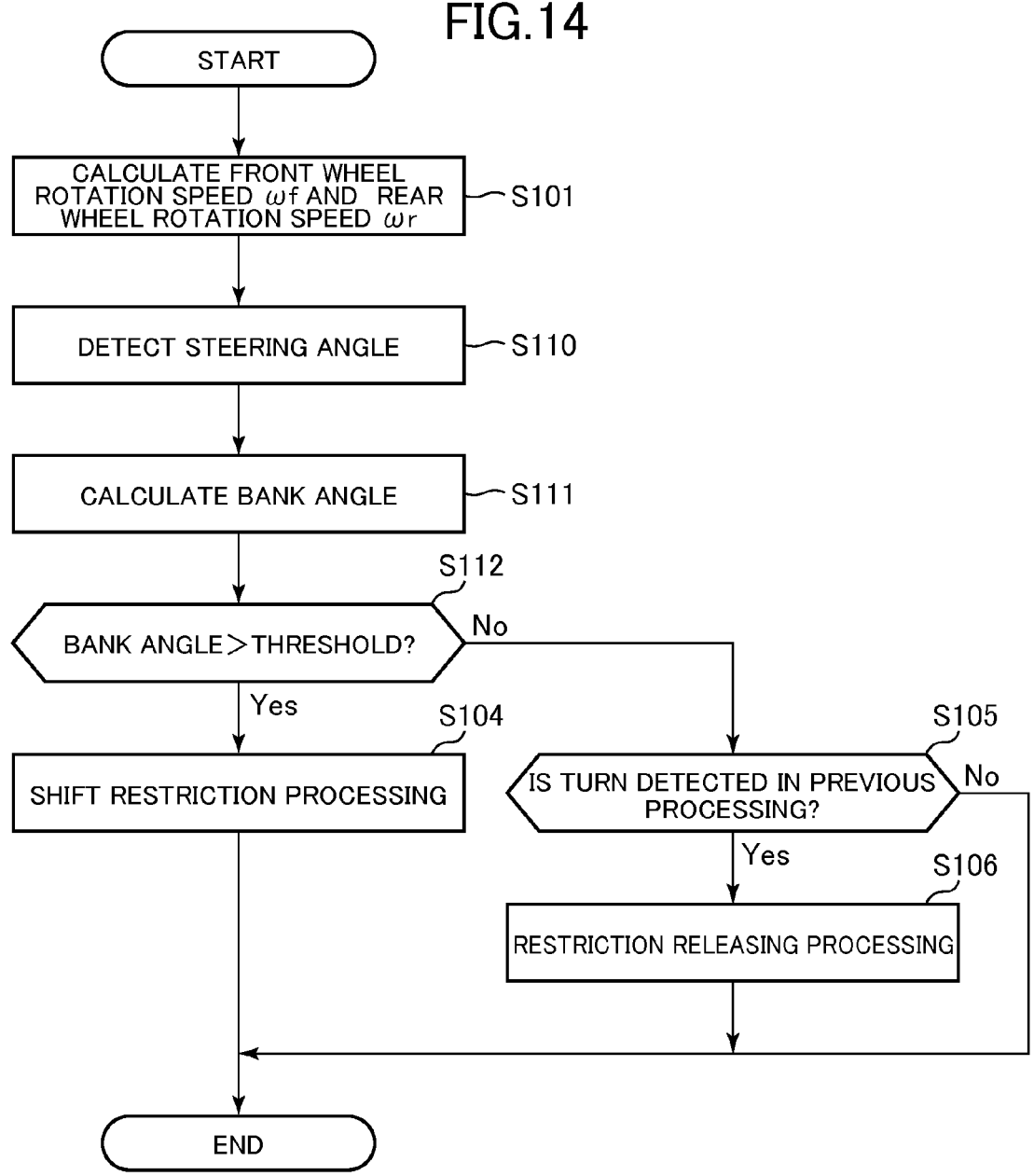
FIG. 14 is a flowchart showing another example of a process executed by the control device.

FIG. 14 is a flowchart of an example of a process executed by the turn determining section 10b in the present preferred embodiment. In the diagram, the processes that are the same as the above described processes are given the same reference numerals. The process shown in FIG. 14 as well is repetitively executed while the vehicle is running.

Initially, the control device 10 calculates the rotation speed of the front wheel 2F and that of the rear wheel 2R (S101). Further, the control device 10 detects the steering angle of the steering handle 6 based on an output signal from the steering angle sensor 9c (S110).

Thereafter, the turn determining section 10b calculates the bank angle of the vehicle based on the steering angle and the rotation speeds of the front wheel 2F and of the rear wheel 2R (S111). These processes are executed as follows, for example.

As described with reference to FIG. 7, the relative speed value (defined as $\Delta Sttl$ here, being $\omega r - k \times \omega f$ or $\omega r/(k \times \omega f)$, for example) between the rotation speed of the front wheel 2F and that of the rear wheel 2R is a sum of a component attributed to rotation of the steering handle 6 (in the following, a steering component $\Delta Ss$) and a component $\Delta Sb$ attributed to banking (in the following, a bank component).

At S111, the turn determining section 10b calculates the steering component $\Delta Ss$ based on the steering angle. For example, a map that correlates the steering component and the steering angle is stored in the storage unit 19, and the control device 10b calculates a steering component $\Delta Ss$ correlated to the steering angle detected by the steering angle sensor 9c with reference to the map. Further, the turn determining section 10b calculates the relative speed value $\Delta Sttl$ based on the rotation speed of the front wheel 2F and that of the rear wheel 2R, as calculated at S101. Still further, the turn determining section 10b calculates the bank component $\Delta Sb$ ($\Delta Sb = \Delta Sttl - \Delta Ss$) based on the relative speed value $\Delta Sttl$ and the steering component $\Delta Ss$. The turn determining section 10b calculates the bank angle based on the bank component $\Delta Sb$. For example, a map that correlates the bank component $\Delta Sb$ and the bank angle is stored in the storage unit 19, and the turn determining section 10b calculates a bank angle correlated to the calculated bank component $\Delta Sb$ with reference to the map.

After calculation of the bank angle, the turn determining section 10b determines whether or not the bank angle is larger than a threshold (S112).

When the bank angle is larger than the threshold, it is determined that the vehicle is turning. In this case, similar to the processes in FIG. 10, the shift restricting section 10c executes the shift restriction process (S104). Meanwhile, when the bank angle is smaller than the threshold, the processes at S105, S106 are executed.

The above described shift restricting section 10c executes the shift restriction process when the determination is made that the vehicle is turning. Further, the shift restricting section 10c may execute the shift restriction process in response to a brake operation performed by the driver. In this case, the processes described below, for example, are executed.

In the storage unit 19, a flag indicating that a brake is operated (in the following, a brake flag) and a flag indicating that a vehicle is turning (in the following, a turn flag) are stored. The shift restricting section 10c executes the shift restriction process when either one of the flags comes into the ON state (that is, when either a brake operation is executed or a vehicle is turning). Meanwhile, the shift restricting section 10c executes the restriction release process when the brake flag and the turn flag are both in the OFF state.

The brake flag may be returned to the OFF state when a predetermined period of time elapses (in the following, a delayed brake end period) after a moment at which a brake operation comes to be no longer detected. Further, the turn flag may be returned to the OFF state when a predetermined period of time in which the relative speed value is smaller than the turn determination threshold (in the following, a delayed turn end period) elapses. With the above, when it is determined that a vehicle is turning and a brake operation is detected, the shift restricting section 10c executes the restriction release process at a latter end between the end of the brake operation delay time and the end of the turn end delayed time.

Figure 15:
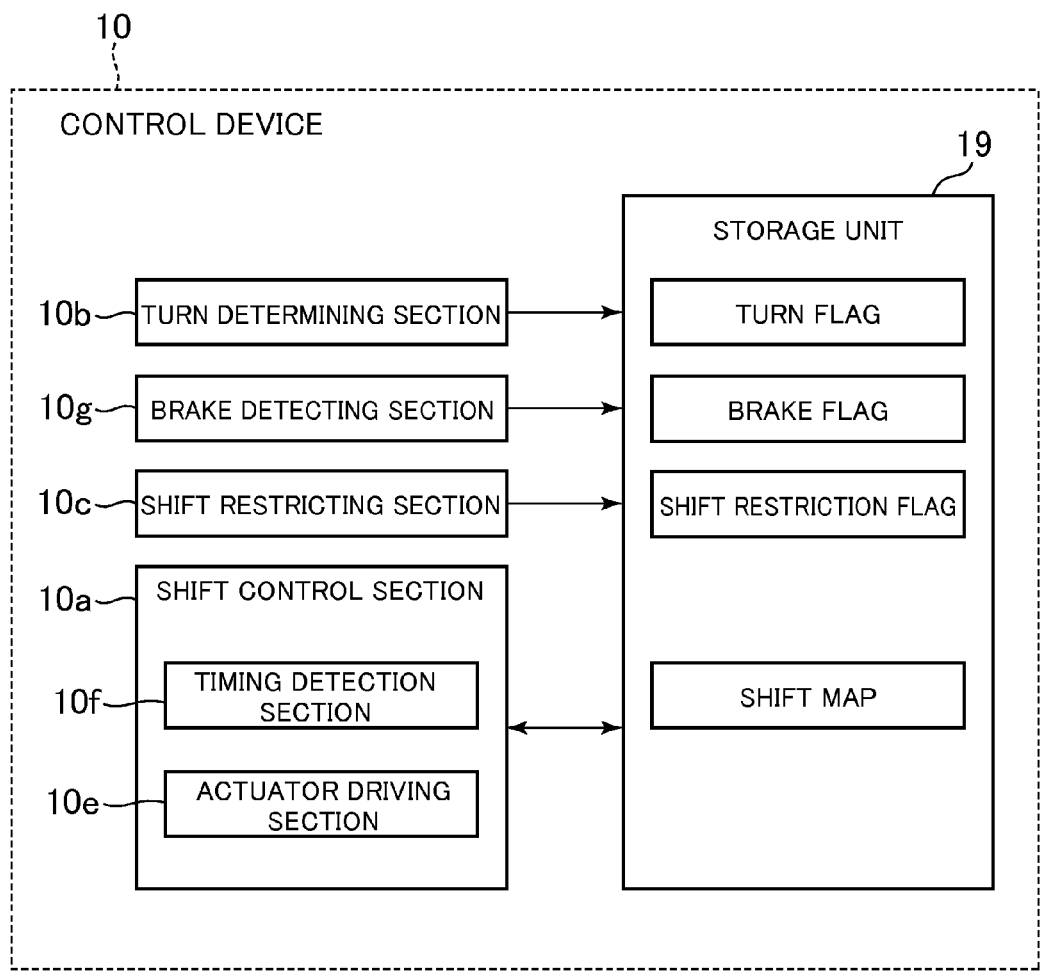
FIG. 15 is a block diagram showing functions of a control device according to another preferred embodiment of the present invention.
Figure 16:
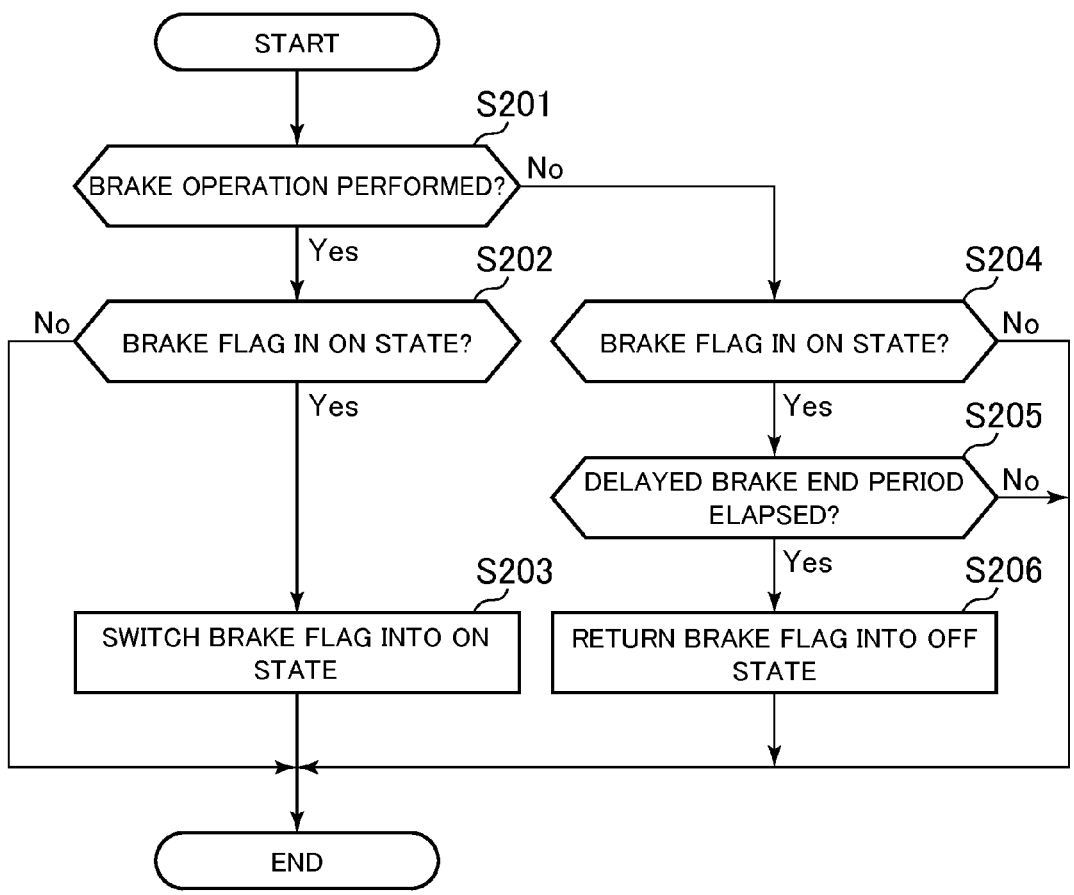
FIG. 16 is a flowchart showing an example of a process executed by a brake detecting section of the control device shown in FIG. 15.

FIG. 15 is a block diagram showing functions of the control device 10 according to the present preferred embodiment. According to the present preferred embodiment, the control device 10 additionally includes a brake detecting section 10g. FIG. 16 is a flowchart showing an example of a process executed by the brake detecting section 10g. This process is repetitively executed while the vehicle is running.

The brake detecting section 10g determines whether or not a brake operation is performed based on an output signal from the brake sensor 9d (S201). When a brake operation is performed, the brake detecting section 10g determines whether or not the brake flag is already in the ON state, that is, whether or not a brake operation has been performed in the previous process (S202). When the brake flag is already in the ON state, the brake detecting section 10g simply ends the current process. Meanwhile, when it is determined at S202 that the brake flag is not in the ON state, the brake detecting section 10g changes the brake flag into the ON state (S203). The above-described shift restricting section 10c executes the shift restriction process upon change of the brake flag into the ON state.

When no brake operation is detected at S201, the brake detecting section 10g determines whether or not the brake flag is in the ON state, similar to S202 (S204). When the brake flag is in the OFF state, the brake detecting section 10g simply ends the current process. Meanwhile, when it is determined at S204 that the brake flag is in the ON state, it is determined whether or not the delayed brake end period has elapsed after a moment of determination that the previous brake operation has ended (S205). When the delayed brake end period has not elapsed yet, the brake detecting section 10g simply ends the current process without changing the state of the brake flag. Meanwhile, when the delayed brake end period has already elapsed, the brake detecting section 10g changes the brake flag into the OFF state (S206). In the above, in a case in which the turn flag is also in the OFF state, the shift restricting section 10c executes the restriction release process.

In the present preferred embodiment, the process by the turn determining section 10b is executed as follows, for example. Upon determination in the process at S103 shown in FIG. 10 that the vehicle is turning, the turn determining section 10b changes the turn flag into the ON state. Meanwhile, upon determination in the process at S103 that the vehicle is not turning, the turn determining section 10b determines whether or not the turn flag is in the ON state. When the turn flag is in the ON state, the turn flag is changed into the OFF state when the delayed turn end period elapses after a moment at which the immediately preceding turn ends.

According to the present preferred embodiment, in a case of successive curved paths, it is possible to maintain the restriction of the shift control until the vehicle comes out of all of the curved paths from a moment immediately before the vehicle enters the curved path. For example, when the two-wheeled motor vehicle 1 runs on an S-shaped curve including successive right and left curved paths, a shift control restriction functions as described below. That is, before the vehicle enters the curved path, a brake operation is performed. Thus, the bake flag is placed into the ON state, and the shift restriction process is executed. After the brake operation is performed, the brake flag remains in the ON stage until the delayed brake end period elapses even though the break operation is released. Therefore, the shift restriction process continues. Thereafter, when the vehicle enters the curved path and banks, the turn flag is placed into the ON state. Therefore, even when the braking is released while the vehicle is running on the curved path, restriction of the shift control continues. Further, the turn flag is not changed to the OFF state until the delayed turn end period elapses, as described above. Thus, restriction of the shift control continues when a short straight path intervenes between two curved paths. When the vehicle thereafter comes out the curved path and the delayed turn end period elapses, the turn flag is changed into the OFF state. Generally, a brake operation is already released when a vehicle comes out of a curved path. Therefore, the turn flag and the brake flag are both in the OFF state after elapse of the delayed turn end period. Accordingly, the restriction release process is executed so that shifting by the shift control section 10a can be allowed.

Figure 17:
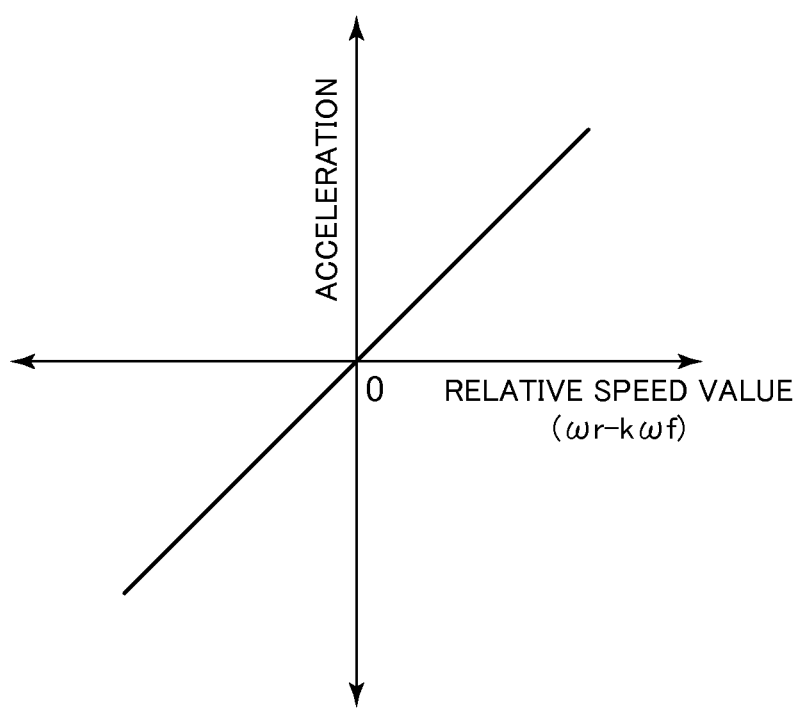
FIG. 17 is a graph schematically showing a relationship between an acceleration of the vehicle and a relative speed value of a vehicle running straight at a certain vehicle speed.

While a vehicle is running, an acceleration of the vehicle causes a difference between the rotation speed of the rear wheel 2R and that of the front wheel 2F. For example, at acceleration, the rear tire 2r is slightly deformed due to friction with the ground surface even though the rear tire 2r is not slipping on the ground surface. As a result, the rotation speed of the rear wheel 2R increases compared to the rotation speed of the front wheel 2F. FIG. 17 shows a graph schematically showing a relationship between the relative speed value ($\omega r - k \times \omega f$) and the acceleration of a vehicle running straight at a certain vehicle speed, wherein the abscissa indicates the relative speed value and the ordinate indicates acceleration. As shown in the diagram, the relative speed value is substantially proportional to acceleration. When acceleration is positive, the relative speed value is a positive value. That is, when acceleration is positive, the rotation speed of the rear wheel 2R becomes higher than the rotation speed of the front wheel 2F. Meanwhile, when acceleration is negative (that is, during deceleration), the relative speed value is a negative value. That is, the rotation speed of the rear wheel 2R becomes lower than the rotation speed of the front wheel 2F. Note that when the rear wheel 2R slips, the relative speed value becomes much higher. In this case, acceleration becomes gradually smaller as the relative speed value increases.

As described above, the relative speed value is subjected to the influence of acceleration of the vehicle. That is, the relative speed value includes a component due to banking of the vehicle and a component due to acceleration of the vehicle (in the following, acceleration component). Therefore, the control device 10 may change the turn determination threshold, depending on the acceleration state of a vehicle, in order to reduce the influence of the acceleration component in turn determination. With the above, it is possible to detect turning of the vehicle more accurately.

Figure 18:
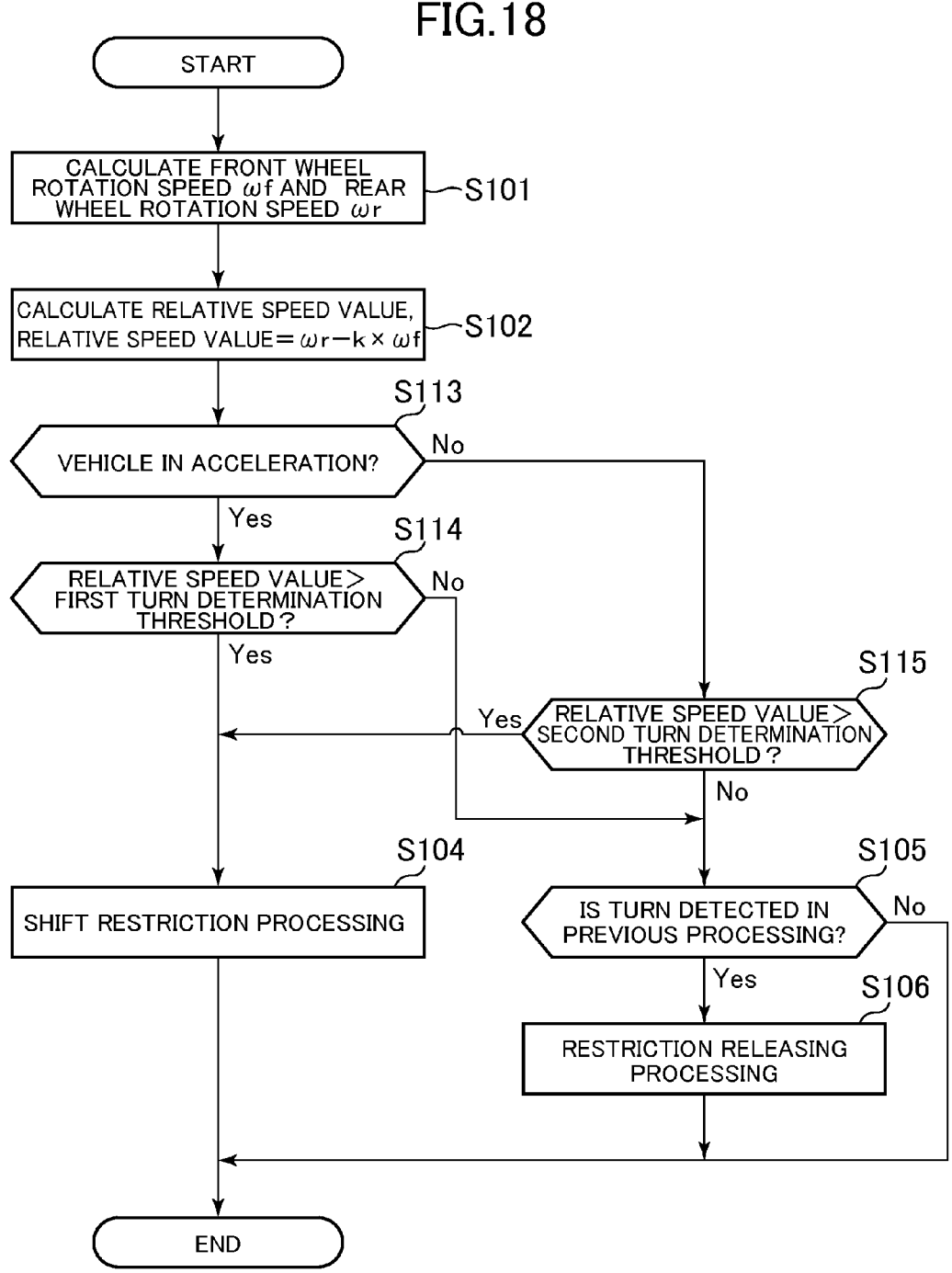
FIG. 18 is a flowchart showing an example of a process executed by a control device according to yet another preferred embodiment of the present invention.

FIG. 18 is a flowchart of an example of a process executed by the turn determining section 10b in the present preferred embodiment. In this diagram as well, processes that are the same as the above described processes are given the same reference numerals.

Below, a process will be described as an example in which either of a first turn determination threshold and a second turn determination threshold lower than the first turn determination threshold is selectively used as the turn determination threshold, depending on the acceleration state of a vehicle.

Initially, similar to the above, the turn determining section 10b calculates the rotation speed of the front wheel 2F and that of the rear wheel 2R (S101) and then calculates the relative speed value ($\omega r - k \times \omega f$ in FIG. 18) based on these values (S102).

Thereafter, the turn determining section 10b determines whether or not the vehicle is accelerating (S113). Specifically, the turn determining section 10b determines whether or not a value correlated to the acceleration is higher than a threshold. For example, when the vehicle includes an acceleration sensor, the turn determining section 10b determines whether or not the vehicle is accelerating based on an output signal from the acceleration sensor. Alternatively, the turn determining section 10b may determine whether or not the vehicle is accelerating based on a differential value of the rotation speed of the front wheel 2F (a differential value of the vehicle speed). Further, the turn determining section 10b may determine whether or not the vehicle is accelerating based on the engine torque or the accelerator opening degree.

When the vehicle is accelerating, the turn determining section 10b determines whether or not the relative speed value is higher than the first turn determination threshold (S114). When the relative speed value is higher than the first turn determination threshold, it is determined that the vehicle is turning, and thus, the shift restricting section 10c executes the shift restriction process (S104).

Meanwhile, when it is determined at S114 that the vehicle is not accelerating, that is, the vehicle is decelerating or running at a constant speed, the turn determining section 10b determines whether or not the relative speed value is higher than the second turn determination threshold (S115). When the relative speed value is higher than the second turn determination threshold, it is determined that the vehicle is turning, and thus the shift restricting section 10c executes the shift restriction process (S104).

Since the first turn determination threshold higher than the second turn determination threshold is used when the vehicle is accelerating, the influence of an acceleration component of the relative speed value can be reduced in the turn determination.

The turn determining section 10*b* may calculate the turn determination threshold based on a value corresponding to the acceleration of the vehicle. The turn determining section 10*b* may perform the turn determination using the calculated turn determination threshold. In other words, the turn determining section 10*b* may perform the turn determination using a turn determination threshold that is modified based on the acceleration of the vehicle.

Figure 19:
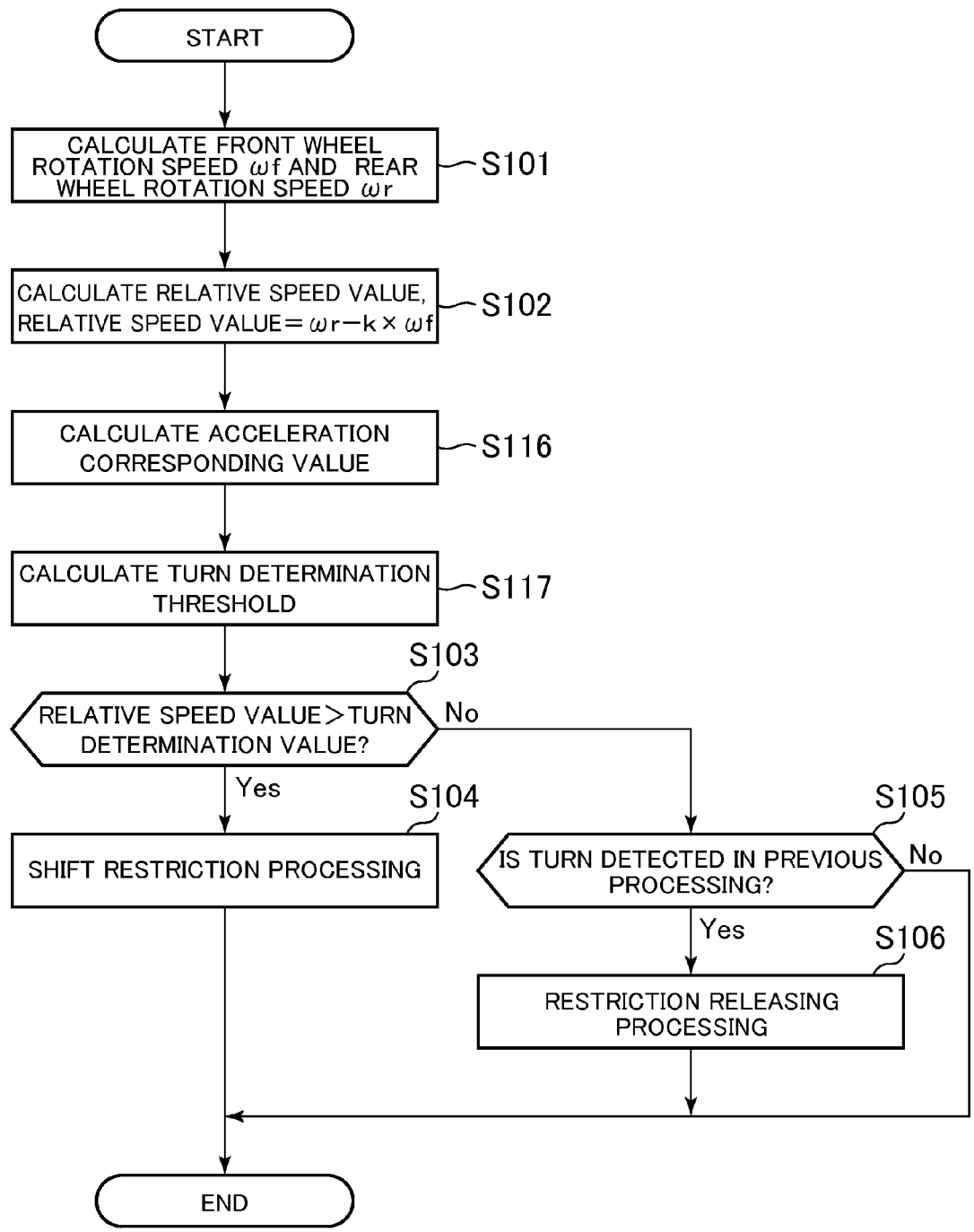
FIG. 19 is a flowchart showing another example of the process shown in FIG. 18.

FIG. 19 is a flowchart showing an example of a process executed by the turn determining section 10*b* in the present preferred embodiment. In this diagram as well, processes that are the same as the above described processes are given the same reference numerals.

The turn determining section 10*b* calculates a value corresponding to the acceleration of a vehicle (in the following, an acceleration corresponding value) (S116). The acceleration corresponding value may be the acceleration itself or an engine power or a driving force of the rear wheel 2R. Thereafter, the turn determining section 10*b* calculates a turn determination threshold based on the acceleration corresponding value (S117). For example, a map or a relational expression that correlates the acceleration corresponding value with a correction value is stored in advance in the storage unit 19. The correction value is, for example, a relative speed value (the above mentioned vehicle component) at a time when a vehicle is accelerating at the acceleration corresponding value. Then, the turn determining section 10*b* calculates a turn determination threshold for the determination process based on the correction value and the initial value of the turn determination threshold.

Thereafter, the turn determining section 10*b* determines whether or not the relative speed value calculated at S102 is higher than the turn determination threshold calculated at S117 (S103). When the relative speed value is higher than the turn determination threshold, it is determined that the vehicle is turning, and similar to the above described process, the shift restricting section 10*c* executes the shift restriction process (S104). Meanwhile, when it is determined at S103 that the relative speed value is not higher than the turn determination threshold, the processes at S105, S106 are executed before ending the current process, similar to the above.

Figure 20:
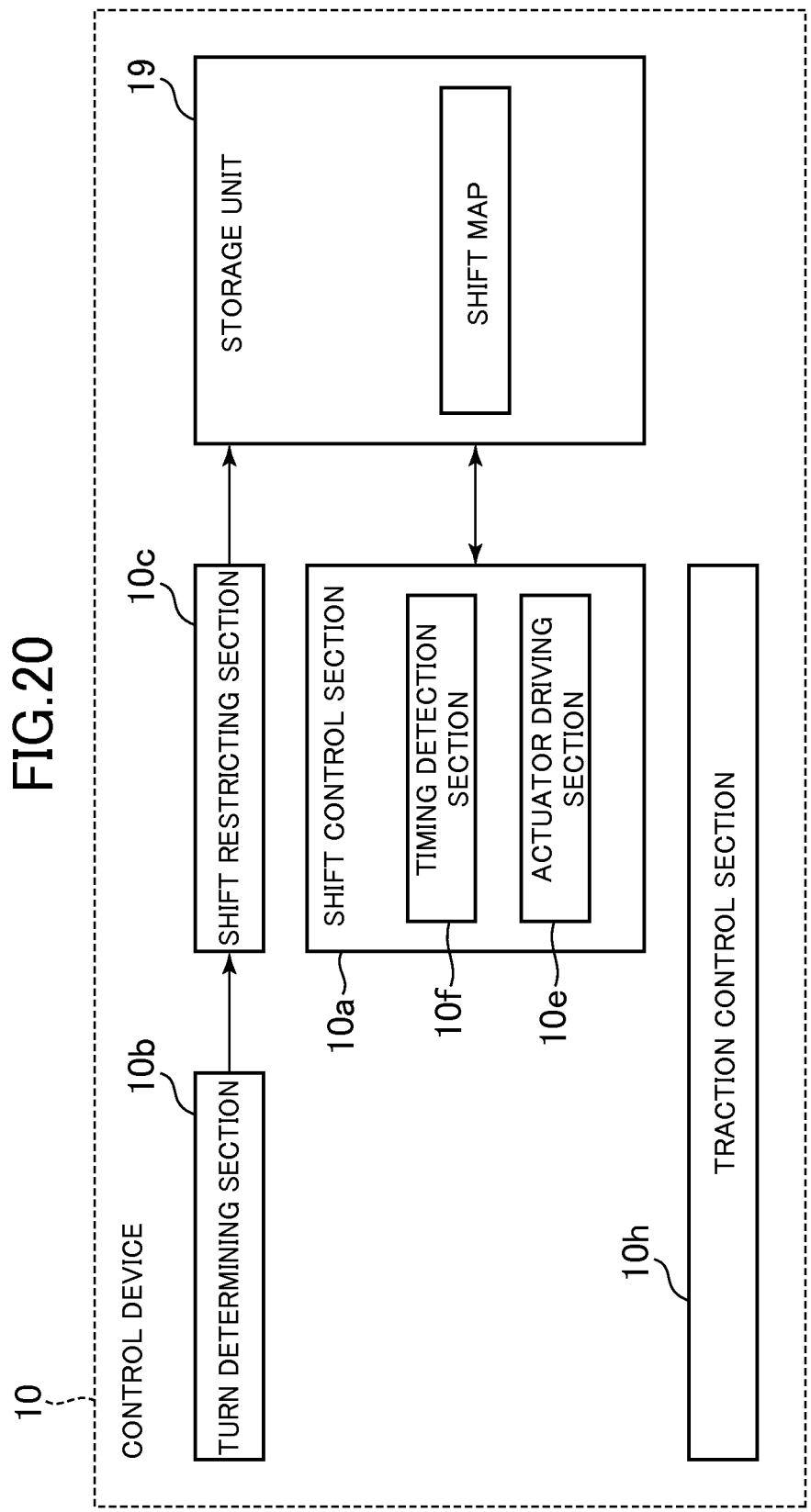
FIG. 20 is a block diagram showing functions of a control device according to another preferred embodiment of the present invention.

Preferred embodiments of the present invention may be applied to a two-wheeled motor vehicle that executes traction control, for example. FIG. 20 is a block diagram showing functions of the control device 10 according to the present preferred embodiment.

As shown in the diagram, the control device 10 in the present preferred embodiment includes a traction control section 10*h*. The traction control section 10*h* determines whether or not the rear wheel 2R is slipping based on the rotation speed of the front wheel 2F and that of the rear wheel 2R. For example, the traction control section 10*h* determines whether or not the relative speed value is larger than a threshold (in the following, a slip determination threshold). When the rear wheel 2R is slipping (for example, when the relative speed value is higher than the slip determination threshold), the traction control section 10*h* executes traction control (that is, a control to reduce the engine torque).

In the present preferred embodiment, the slip determination threshold and the turn determination threshold are defined so that shifting is restricted by the shift restricting section 10*c* in a case in which slip is caused. That is, the slip determination threshold and the turn determination threshold are set such that the turn determining section 10*b* determines turning of the vehicle before the detection of slip of the rear wheel 2R. For example, when the relative speed value is used in the slip determination, a value lower than a slip determination threshold is set as the turn determination threshold. With the above, the shift control can be prevented from being executed during the traction control. As a result, a change of the drive force due to shifting is not caused while reducing the engine torque by traction control. Thus, stable traction control can be achieved.

Figure 21:
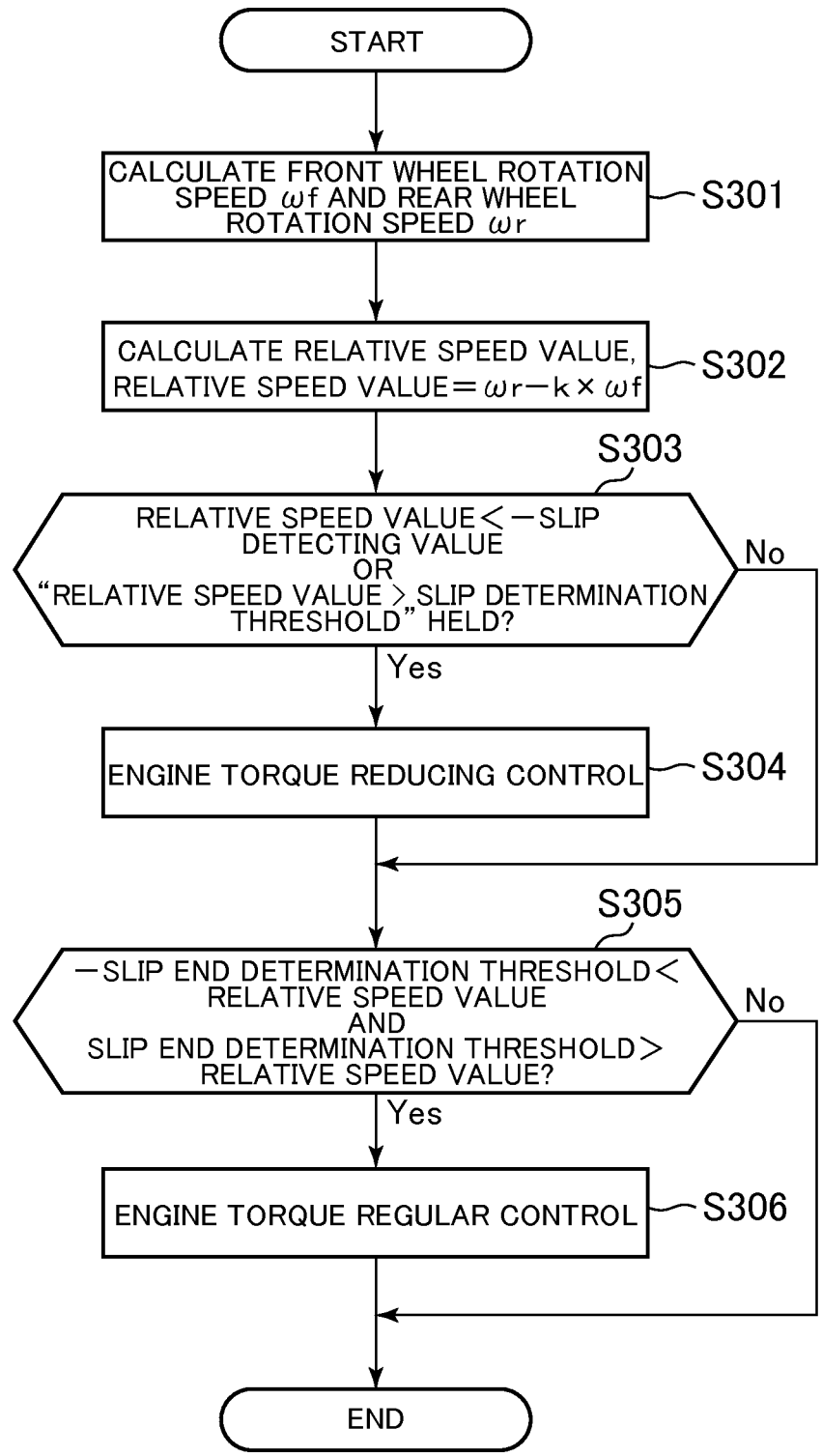
FIG. 21 is a flowchart showing an example of a process executed by a traction control section of the control device shown in FIG. 20.

FIG. 21 is a flowchart showing an example of a process executed by the traction control section 10*h*. This process is repetitively executed while the vehicle is running.

Initially, the control device 10 calculates the rotation speed of the front wheel 2F and that of the rear wheel 2R (S301). Then, the traction control section 10*h* calculates the relative speed value based on the calculated rotation speeds (S302). Then, the traction control section 10*h* determines whether or not slip is caused based on the relative speed value. Specifically, the traction control section 10*h* determines whether or not the absolute value of the relative speed value is larger than a slip determination threshold (S303). When the absolute value of the relative speed value is larger than the slip determination threshold, the traction control section 10*h* starts traction control. Specifically, the traction control section 10*h* causes the engine torque (S304) to be reduced. For example, the traction control section 10*h* reduces the fuel injection amount by the fuel injection device mounted on the engine 12, delays an ignition time, and reduces the throttle valve opening degree.

As described above, the turn determination threshold is lower than the slip determination threshold in the present preferred embodiment. Thus, when it is determined at S303 that the relative speed value is higher than the slip determination threshold, it is determined in the process by the turn determining section 10*b* that the vehicle is already turning. Further, the shift restriction process (switching of the shift restriction flag into the ON state or change of the shift map) is already executed.

After the process at S304, the traction control section 10*h* determines whether or not the slip of the rear wheel 2R is reduced/eliminated. Specifically, the traction control section 10*h* determines whether or not the absolute value of the relative speed value is smaller than a threshold (in the following, a slip end threshold) (S305). The slip end threshold is set lower than the slip determination threshold. When the relative speed value is smaller than the slip end threshold, the traction control section 10*h* ends the traction control. That is, the traction control section 10*h* executes a normal control of the engine torque to restore the engine torque (S306). Note that when it is determined at S303 that the absolute value of the relative speed value is not larger than the slip determination threshold, the determination at S305 is made before ending the current process. Meanwhile, when it is determined at S305 that the absolute value of the relative speed value is not smaller than the slip end threshold, the current process is simply ended without returning to normal control of the engine torque.

The control device 10 may include a function to update/correct the coefficient k for use in the process executed by the turn determining section 10*b*. The coefficient k compensates for the difference in the radius between the front tire 2*f* and the rear tire 2*r*. The actual radius of the front tire 2*f* and that of the rear tire 2*r* may change due to abrasion of the tires 2*f*, 2*r*. In this case, even when the vehicle is running straight, the relative speed value does not represent a value indicating straight running. For example, when the relative speed value is $\omega r - k \times \omega f$ or $\omega r/(k \times \omega f)$, these values do not represent 0 or 1 even when the vehicle is running straight. To address the above, the control device 10 may include a function to address such a deficiency.

Figure 22:
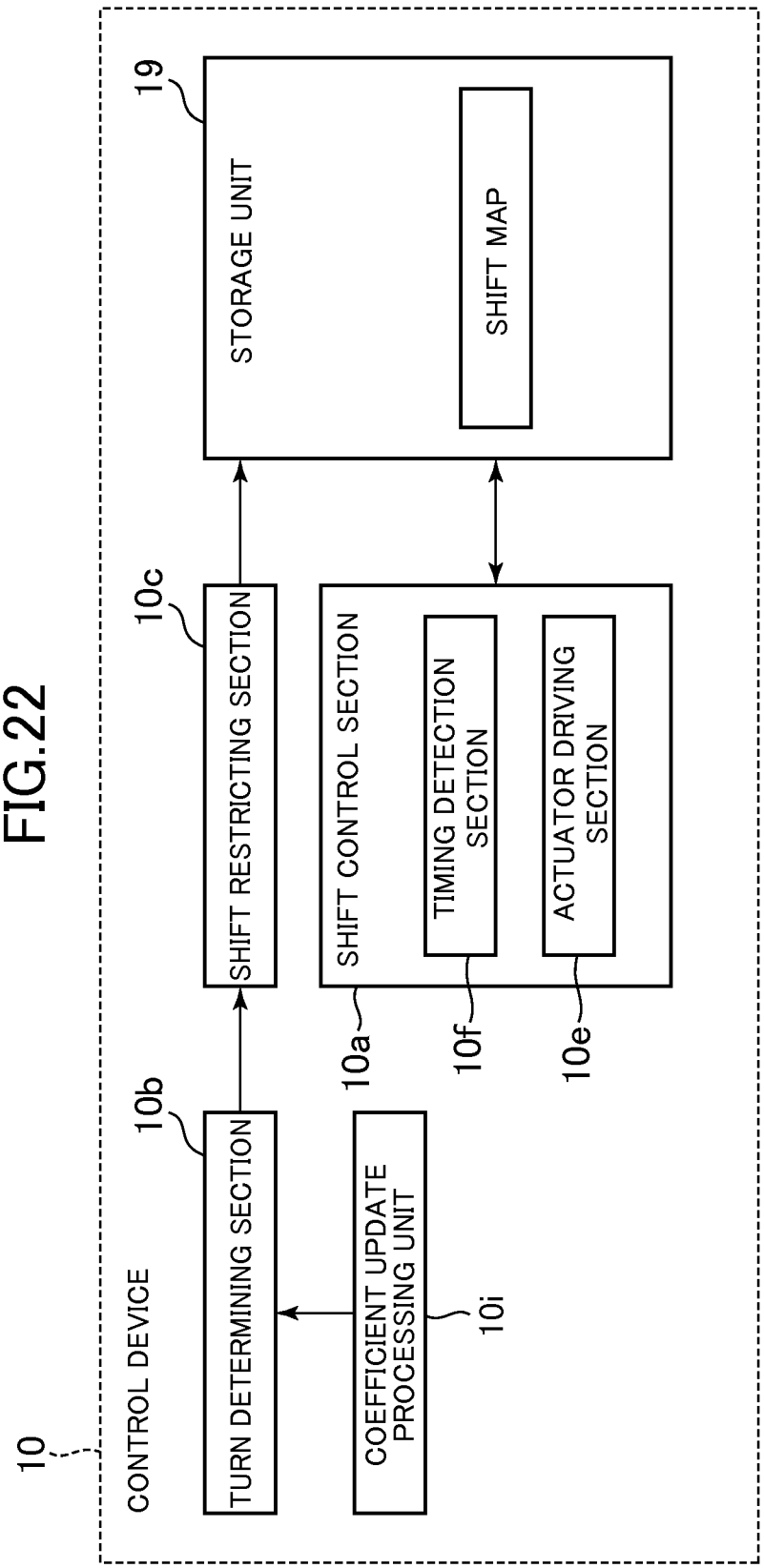
FIG. 22 is a block diagram showing functions of a control device according to another preferred embodiment of the present invention.
Figure 23:
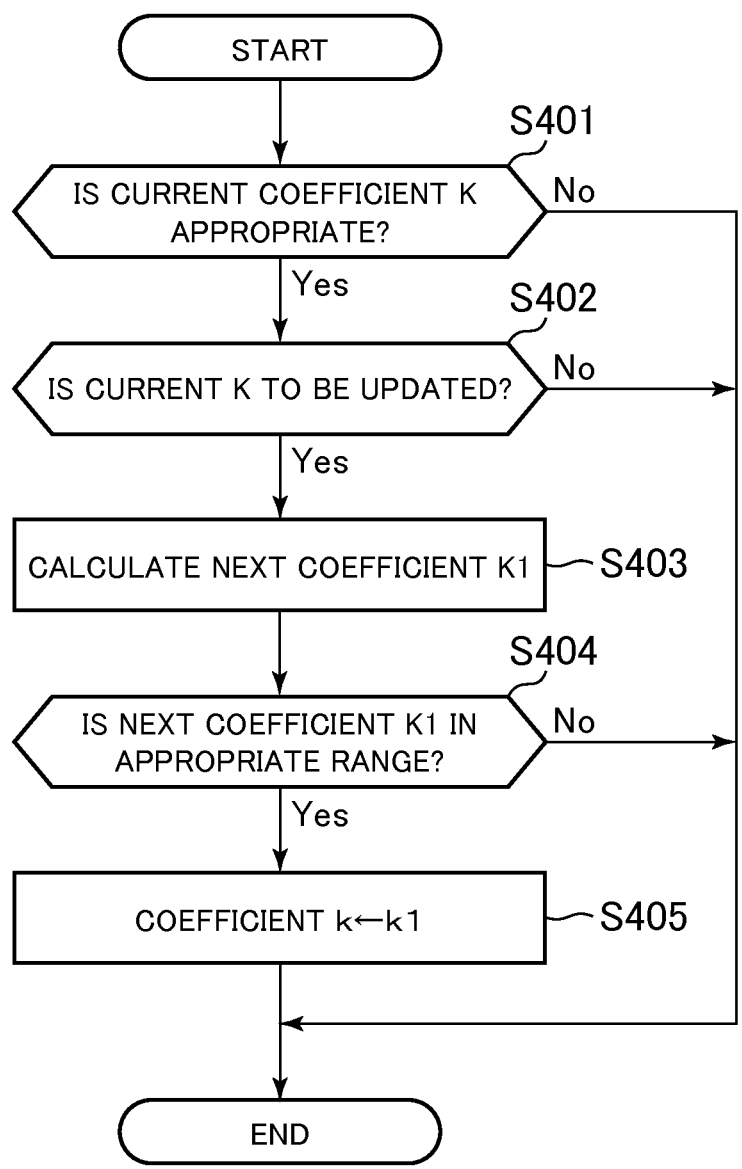
FIG. 23 is a flowchart showing an example of a process executed by a coefficient updating section of the control device shown in FIG. 22.

FIG. 22 is a block diagram showing functions of the control device 10 in the present preferred embodiment. As shown in the diagram, the control device 10 further includes a coefficient updating section 10*i* in the present preferred embodiment. FIG. 23 is a flowchart showing an example of a process executed by the coefficient updating section 10*i*.

As shown in FIG. 23, initially, the coefficient updating section 10*i* determines whether or not it is necessary to update the coefficient k. In this example, the coefficient updating section 10*i* determines in two steps whether or not the update is necessary. That is, initially, the coefficient updating section 10*i* determines whether or not the current coefficient k is appropriate (S401). For example, the coefficient updating section 10*i* determines whether or not a period of time (in the following, referred to as "assumed straight running period") in which the relative speed value coincides with a value indicating that a vehicle is running straight has lasted longer than a predetermined period of time (in the following, an determination period). The value indicating running straight will be referred as a straight-running indication value, being 0 or 1 in the above example. While running, generally, the vehicle runs straight for a longer period of time compared to a period of time in which the vehicle is turning. Therefore, when the assumed straight running period has lasted longer than the predetermined period, the coefficient updating section 10*i* determines that the current coefficient k is appropriate, and ends the current process.

Meanwhile, when the assumed straight running period has not lasted longer than the determination period, it can be determined that the current coefficient k is not appropriate, that is, the current coefficient k has deviated from an appropriate value to compensate for the difference in the radius between the tires 2*f* and 2*r*. In this case, the coefficient updating section 10*i* determines whether or not to update the coefficient k (S402). That is, the coefficient updating section 10*i* determines whether or not the deviation of the coefficient k is attributed to abrasion or the like of the tires 2*f*, 2*r*. For example, the coefficient updating section 10*i* determines at S402 whether or not to update the coefficient k based on the period of time in which the relative speed value calculated with the current coefficient stays at a constant value, and based on the constant value. More specifically, the coefficient updating section 10*i* determines whether or not the period of time in which the relative speed value calculated with the current coefficient stays at a constant value has lasted longer than a predetermined period of time. Further, the coefficient updating section 10*i* determines at S402 whether or not the constant value is close to the straight-running indication value, that is, within a predetermined range.

When it is determined at S402 that the deviation of the current coefficient k is subjected to an update process attributed to abrasion or the like, the coefficient updating section 10*i* calculates a coefficient k that is appropriately estimated. Specifically, the coefficient updating section 10*i* calculates a coefficient that makes the relative speed value coincide with the straight-running indication value when a vehicle is running straight (in the following, a next coefficient k1) (S403). The coefficient updating section 10*i* calculates the next coefficient k1 based on the rotation speed of the front wheel 2F and that of the rear wheel 2R. For example, the coefficient updating section 10*i* detects the time in which a vehicle is running straight based on a change in the relative speed value using the current coefficient k. For example, when a period of time in which the relative speed value stays at a constant value has lasted longer than a predetermined period of time, it is determined that the vehicle is running straight. Then, the coefficient updating section 10*i* calculates the next coefficient k1 (for example, k1=ωr/ωf) based on the rotation speed of the front wheel 2F and that of the rear wheel 2R calculated when the vehicle is running straight.

Note that the process to obtain the next coefficient k1 is not limited to the above. For example, the coefficient updating section 10*i* may successively calculate the relative speed value based on the rotation speeds of the front wheel 2F and of the rear wheel 2R and the current coefficient k, and store the calculated values in the storage unit 19. The coefficient updating section 10*i* may generate histogram data that expresses a distribution of the relative speed values. Then, the coefficient updating section 10*i* may calculate the next coefficient k1 based on a relative speed value with the maximum frequency. For example, the coefficient updating section 10*i* may calculate the next coefficient k1 (for example, k1=ωr/ωf) based on the rotation speeds ωf, ωr leading to a relative speed value with the maximum frequency.

Thereafter, the coefficient updating section 10*i* determines whether or not the next coefficient k1 calculated at S403 is defined in a predetermined appropriate range (S404). When the next coefficient k1 is defined in the appropriate range, the coefficient updating section 10*i* writes the next coefficient k1 over the current coefficient k stored in the storage unit 19 (S405). Thereafter, the above mentioned turn determining section 10*b* calculates the relative speed value, using the over-written coefficient k, to determine whether or not the vehicle is turning.

Further, the coefficient updating section 10*i* may execute the following process. The coefficient updating section 10*i* determines at S401 whether or not the minimum value of the relative speed value that is calculated in a predetermined period of time (in the following, an update determination period (for example, ten seconds)) coincides with the straight-running indication value. For example, when the relative speed value is ωr/(k×ωf), the coefficient updating section 10*i* determines whether or not the minimum value of the relative speed value calculated in the update determination period is 1. Meanwhile, when the relative speed value is ωr−(k×ωf), the coefficient updating section 10*i* determines whether or not the minimum value of the relative speed value calculated in the update determination period is 0. When the minimum value coincides with the straight-running indication value, the coefficient updating section 10*i* ends the process.

Meanwhile, when the minimum value does not coincide with the straight-running indication value, it is possible that the coefficient k is deviated from an appropriate value. In this case, the coefficient updating section 10*i* determines at S402 whether or not to update the coefficient k, that is, whether or not a difference due to abrasion or the like is caused. Specifically, the coefficient updating section 10*i* determines whether or not the minimum value is calculated when the vehicle is running straight. When the minimum value is calculated when the vehicle is running straight, it can be determined that the coefficient k is deviated from an appropriate value. In this case, the coefficient updating section 10*i* calculates the next coefficient k1, using the rotation speed ωr, ωf that leads to the minimum value (S403), and then executes the subsequent processes S404 and S405.

The process at S402 is executed as follows, for example. The coefficient updating section 10*i* determines whether or not the steering angle at a moment at which the minimum value is calculated is smaller than a predetermined value.

When the steering angle is smaller than the predetermined value, the coefficient updating section 10i determines that the minimum value is calculated when the vehicle is running straight. Alternatively, the coefficient updating section 10i may determine whether or not the vehicle speed at a moment at which the minimum value is calculated is larger than a predetermined value. When the vehicle speed is larger than the predetermined value, the coefficient updating section 10i determines that the minimum value is calculated when the vehicle is running straight. A vehicle runs around a corner at a relatively low speed. Therefore, by defining a relatively high value as the above mentioned predetermined value about the vehicle speed, it is possible to determine based on the vehicle speed whether or not the minimum value of the relative speed value is calculated when the vehicle is running straight. Note that the coefficient updating section 10i may execute both of the above mentioned determination as to the steering angle and determination as to the vehicle speed. When the steering angle is smaller than a predetermined value and the vehicle speed is larger than the predetermined value, the coefficient updating section 10i may determine that the minimum value is calculated when the vehicle is running straight.

When the braking force of the rear wheel 2R is larger than that of the front wheel 2F, the rotation speed of the rear wheel 2R is smaller than the rotation speed of the front wheel 2F and thus the relative speed value is, in some cases, smaller than the straight-running indication value. On the contrary, when the brake force of the front wheel 2F is larger than that of the rear wheel 2R, the relative speed value is, in some cases, larger than the straight-running indication value because of the difference in the braking force. In view of this, the coefficient updating section 10i may make a determination at S402 as to whether or not a brake operation is performed at a moment at which the minimum value is calculated, in addition to the determinations as to the steering angle and the vehicle speed. When no brake operation is performed, the coefficient updating section 10i updates the coefficient k at S403 to S405.

When a vehicle is suddenly accelerating or decelerating, the relative slip value deviates from the straight-running indication value due to slip of the rear wheel 2R and/or slip of the front wheel 2F. Therefore, the coefficient updating section 10i may make a determination at S402 as to whether or not the absolute value of the acceleration at a moment at which the minimum value is calculated is smaller than a predetermined value, in addition to the determinations as to the steering angle and the vehicle speed. When the absolute value of acceleration is smaller than the predetermined value, the coefficient updating section 10i may update the coefficient k at S403 to S405.

During the update determination period, the coefficient updating section 10i stores, into the storage unit 19, driving states to be used in the determination at S402, and the driving states being correlated to relative speed values. The driving states are the steering angles, the vehicle speeds, a brake operation, or accelerations. Then, at S402, the coefficient updating section 10i reads the driving state correlated to the minimum value from the storage unit 19, and then determines based on the read driving state, whether or not the minimum value is obtained in a period of straight running.

Alternatively, the process at S402 may be executed as follows. The coefficient updating section 10i may determine whether or not a period in which the relative speed value remains at the above-described minimum value (the minimum value maintained period) is longer than a predetermined period of time. Generally, straight running lasts longer than running on a curved path. Therefore, when the minimum value maintained period is longer than a predetermined period of time, the coefficient updating section 10i determines that the minimum value is calculated while the vehicle is running straight, and may update the coefficient k at S403 to S405.

Processes executed by the coefficient updating section 10i is not limited to the above described processes. For example, the coefficient updating section 10i may initially determine whether or not the vehicle is running straight. This process can be executed using the steering angle and vehicle speed. In this case, it is determined that whether or not a brake operation is performed and whether or not the acceleration is smaller than a predetermined value. When the vehicle is running straight without a brake operation and the absolute value of acceleration is smaller than a predetermined value, the coefficient updating section 10i calculates the relative speed value and then determines whether or not the relative speed value coincides with the straight-running indication value (for example, 0 or 1). When the relative speed value does not coincide with the straight-running indication value, the coefficient updating section 10i updates the coefficient k.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A control device for a two-wheeled motor vehicle, in which a curvature radius of a cross-section of a tire mounted on one of a front wheel and a rear wheel is larger than a curvature radius of a cross-section of a tire mounted on the other of the front wheel and the rear wheel, the control device comprising:

a sensor arranged to detect a rotation speed of the one of the front wheel and the rear wheel;

a sensor arranged to detect a rotation speed of the other of the front wheel and the rear wheel; and a turn determining processor programmed to determine that the vehicle is turning based on a condition that a value corresponding to a bank angle of the vehicle is higher than a threshold; wherein a value corresponding to the bank angle of the vehicle is defined as a value indicating a relative amount of the rotation speed of the one of the front wheel and the rear wheel relative to the rotation speed of the other of the front wheel and the rear wheel;

the turn determining processor compares the rotation speed of the one of the front wheel and the rear wheel and the rotation speed of the other of the front wheel and the rear wheel, while utilizing a coefficient corresponding to a difference in a diameter between the tire of the one of the front wheel and the rear wheel and the tire of the other of the front wheel and the rear wheel; and the control device includes a coefficient updating processor that is programmed to determine whether or not the diameter of the tire of the one of the front wheel and the rear wheel or the diameter of the tire of the other of the front wheel and the rear wheel is changed based on the rotation speed of the one of the front wheel and the rear wheel and the rotation of the other of the front wheel and the rear wheel, and then to update the coefficient when it is determined that the diameter has changed.

2. The control device for a two-wheeled motor vehicle according to claim 1, wherein the turn determining processor is programmed to determine whether or not the vehicle is turning based further on at least one of a vehicle speed, an engine torque, a brake operation, and a steering angle of a steering handle.

3. The control device for a two-wheeled motor vehicle according to claim 1, wherein
the turn determining processor is programmed to determine that the vehicle ends its turn when an end condition different from a turn determination condition is satisfied, wherein the turn determination condition is the value corresponding to the bank angle of the vehicle; and
the end condition is defined such that the end condition is satisfied after the turn determination condition comes to be no longer satisfied.

4. The control device for a two-wheeled motor vehicle according to claim 1, further comprising:
a shift controller programmed to execute a control in which a transmission ratio of a transmission is changed; and
a shift restricting processor programmed to restrict the control of the shift controller when the turn determining processor determines that the vehicle is turning.

5. The control device for a two-wheeled motor vehicle according to claim 4, further comprising:
a brake sensor arranged to detect a brake operation by a driver; wherein
the shift restricting processor restricts the control of changing the transmission ratio when the brake operation is detected.

6. The control device for a two-wheeled motor vehicle according to claim 5, wherein
the shift restricting processor maintains restricting the control of changing the transmission ratio for a first predetermined period when the turn determining processor determines that the vehicle is turning, and maintains restricting the control for a second predetermined period when the brake operation is detected; and
in a case in which the turning of the vehicle and the brake operation are detected, the shift restricting processor releases the restriction of the control of changing the transmission ratio when a latter one of the first predetermined period and the second predetermined period ends.

7. The control device for a two-wheeled motor vehicle according to claim 4, further comprising:
a traction controller programmed to detect slipping of the rear wheel based on the rotation speed of the one of the front wheel and the rear wheel, the rotation speed of the other of the front wheel and the rear wheel, and a threshold; wherein
the threshold for the turn determining processor and the threshold for the traction controller are defined such that the turn determining processor determines that the vehicle is turning prior to determination of slipping of the rear wheel.

8. The control device for a two-wheeled motor vehicle according to claim 1, further comprising:
a steering angle sensor arranged to detect a steering angle of a steering handle; wherein
the turn determining processor estimates the bank angle of the vehicle based on the steering angle, the rotation speed of the one of the front wheel and the rear wheel, and the rotation speed of the other of the front wheel and the rear wheel, and then determines that the vehicle is turning based on a condition that the estimated bank angle is larger than the threshold.

9. The control device for a two-wheeled motor vehicle according to claim 1, wherein the turn determining processor changes the threshold depending on an acceleration state of the vehicle.

10. The control device for a two-wheeled motor vehicle according to claim 9, wherein the turn determining processor selectively uses as the threshold, a first threshold and a second threshold different from the first threshold, depending on the acceleration state of the vehicle.

11. The control device for a two-wheeled motor vehicle according to claim 9, wherein the turn determining processor calculates the threshold based on a value corresponding to the acceleration state of the vehicle.

12. The control device for a two-wheeled motor vehicle according to claim 1, wherein the coefficient updating processor is programmed to calculate the value corresponding to the bank angle of the vehicle based on the coefficient, the rotation speed of the other of the front wheel and the rear wheel, and the rotation speed of the one of the front wheel and the rear wheel, then to compare the calculated value and a value to be calculated when the vehicle is running straight, and then to determine whether or not the diameter of the tire of the one of the front wheel and the rear wheel or the diameter of the tire of the other of the front wheel and the rear wheel has changed based on a result of comparison.

13. The control device for a two-wheeled motor vehicle according to claim 12, wherein the coefficient updating processor is programmed to determine whether or not a time when the value corresponding to the bank angle is calculated comes within a period in which the vehicle is running straight, and to determine based on the result of the determination whether or not the diameter of the tire of the one of the front wheel and the rear wheel or the diameter of the tire of the other of the front wheel and the rear wheel has changed.

14. The control device for a two-wheeled motor vehicle according to claim 12, wherein the coefficient updating processor is programmed to determine whether or not a time when the value corresponding to the bank angle is calculated comes within a period of acceleration of the vehicle and/or a period of a brake operation, and then to determine based on the result of the determination whether or not the diameter of the tire of the one of the front wheel and the rear wheel or the diameter of the tire of the other of the front wheel and the rear wheel has changed.

15. The control device for a two-wheeled motor vehicle according to claim 12, wherein the coefficient updating processor is programmed to determine whether or not the value corresponding to the bank angle remains at a predetermined value in a period longer than a predetermined period, and then to determine based on the result of the determination whether or not the diameter of the tire of the one of the front wheel and the rear wheel or the diameter of the tire of the other of the front wheel and the rear wheel has changed.

16. A two-wheeled motor vehicle having a control device according to claim 1.

* * * * *